(12) United States Patent
Pratt

(10) Patent No.: US 6,287,664 B1
(45) Date of Patent: Sep. 11, 2001

(54) CONTINUOUS WAVE COMPOSITE VISCOELASTIC ELEMENTS AND STRUCTURES

(76) Inventor: William F. Pratt, 1184 E. 830 South, Pleasant Grove, UT (US) 84062

( * ) Notice: Subject to any disclaimer, the term of this patent is extended or adjusted under 35 U.S.C. 154(b) by 0 days.

(21) Appl. No.: 09/238,873

(22) Filed: Jan. 27, 1999

Related U.S. Application Data

(63) Continuation-in-part of application No. 08/970,141, filed on Nov. 14, 1997, now Pat. No. 6,048,426.
(60) Provisional application No. 60/072,975, filed on Jan. 29, 1998.

(51) Int. Cl.[7] ................................. B32B 1/04; E04B 1/98
(52) U.S. Cl. ........................ 428/68; 428/174; 52/167.8; 52/783.1
(58) Field of Search ............................. 428/172, 68, 212, 428/71, 73, 109, 119, 120, 116, 174, 178; 52/167.8, 783.1; 267/257

(56) References Cited

U.S. PATENT DOCUMENTS 5,203,435 * 4/1993 Dolgin .............................. 188/322.5
5,335,463 * 8/1994 Reinhall ............................ 52/167 R

FOREIGN PATENT DOCUMENTS

WO93/08023 * 4/1993 (WO).

* cited by examiner

*Primary Examiner*—Donald J. Loney
(74) *Attorney, Agent, or Firm*—Thompson E. Fehr

(57) ABSTRACT

Fiber-reinforced composite structures and applications that exhibit inherent damping with little or no sacrifice in strength and that make use of wavy fiber patterns in the plane of the composite laminate. The invention includes the methods and apparatus for manufacturing the wavy composite material, and the use of the material in the construction of practical structures and devices. The fabrication of a wavy fiber pre-preg (fibers preimpregnated with epoxy resin as an example) can be accomplished with an automated control system that permits the creation of non-periodic or mixed wave forms. Combined with conventional laminate structures and/or materials, these wavy composite materials allow the design engineer to "tune" the dynamics (e.g. damping, stiffness) of a structural member. The use of wavy patterns in the laminate is not limited to the use of traditional epoxies but may also be used in conjunction with specialized matrix materials having inherent viscoelastic properties.

8 Claims, 24 Drawing Sheets

Non-Periodic Fiber Pattern

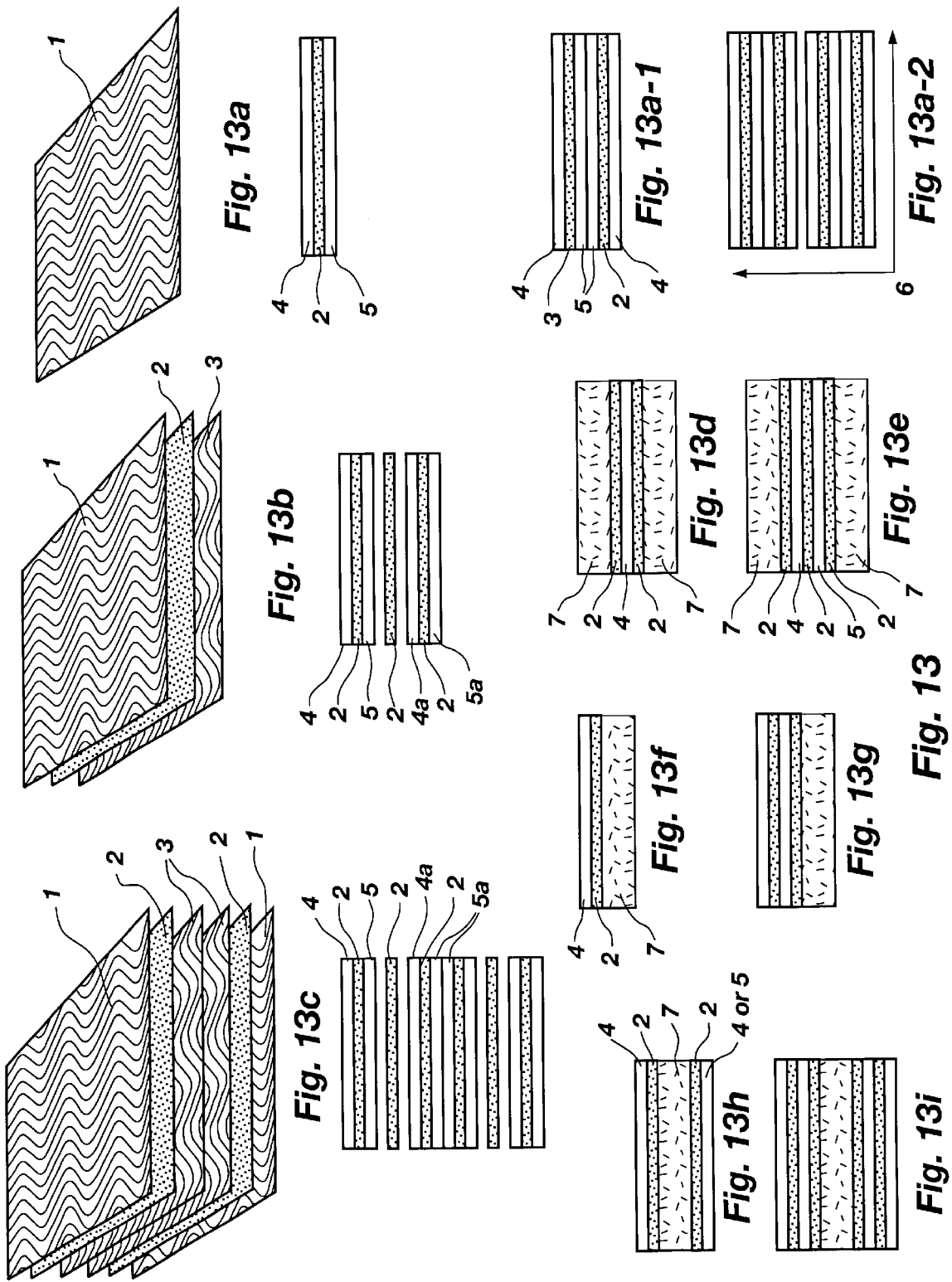

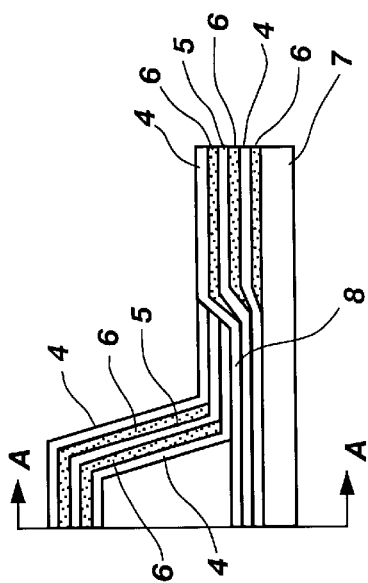
Fig. 14a
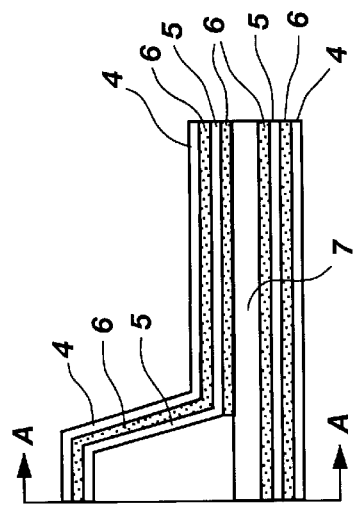
Fig. 14e
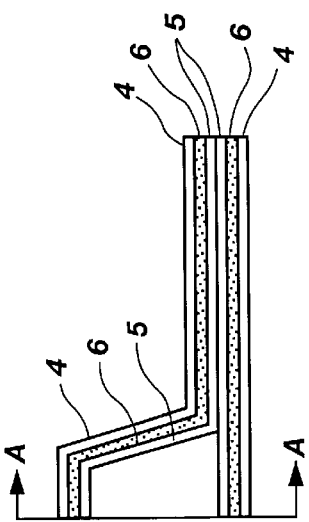
Fig. 14c
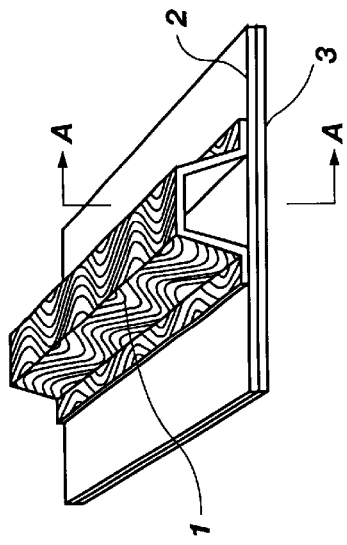
Fig. 14b
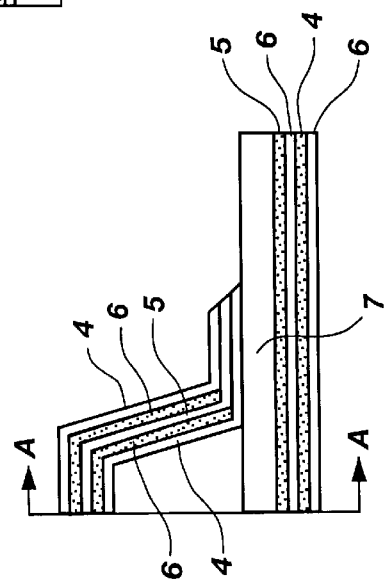
Fig. 14d
Fig. 14

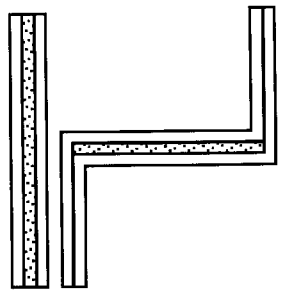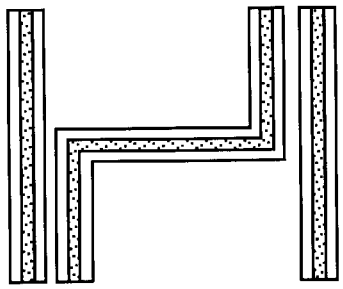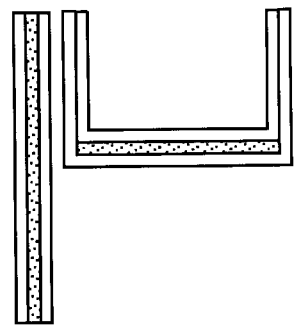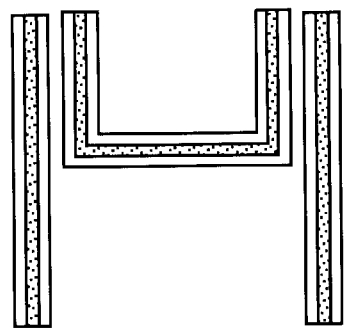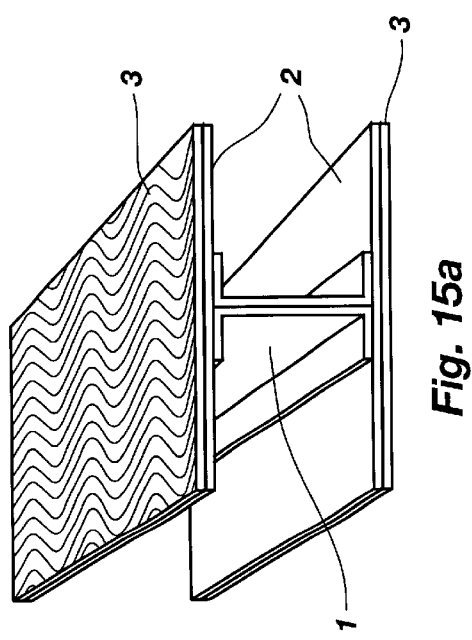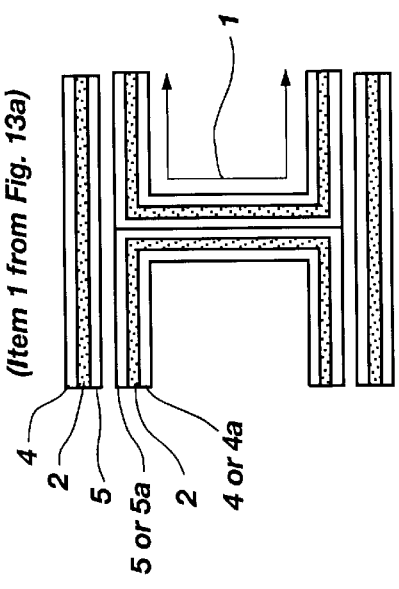

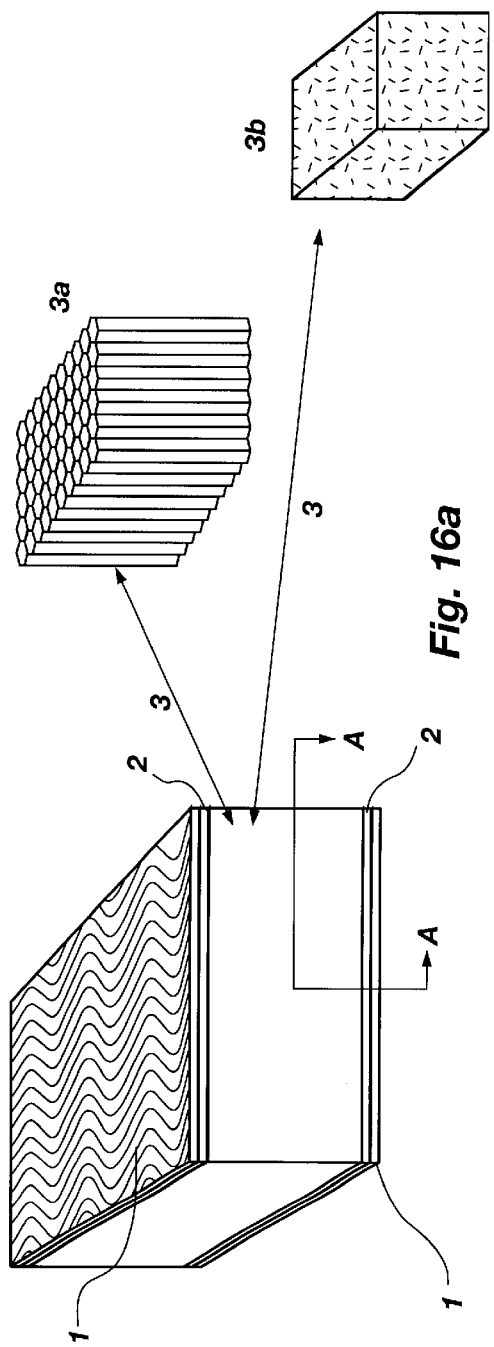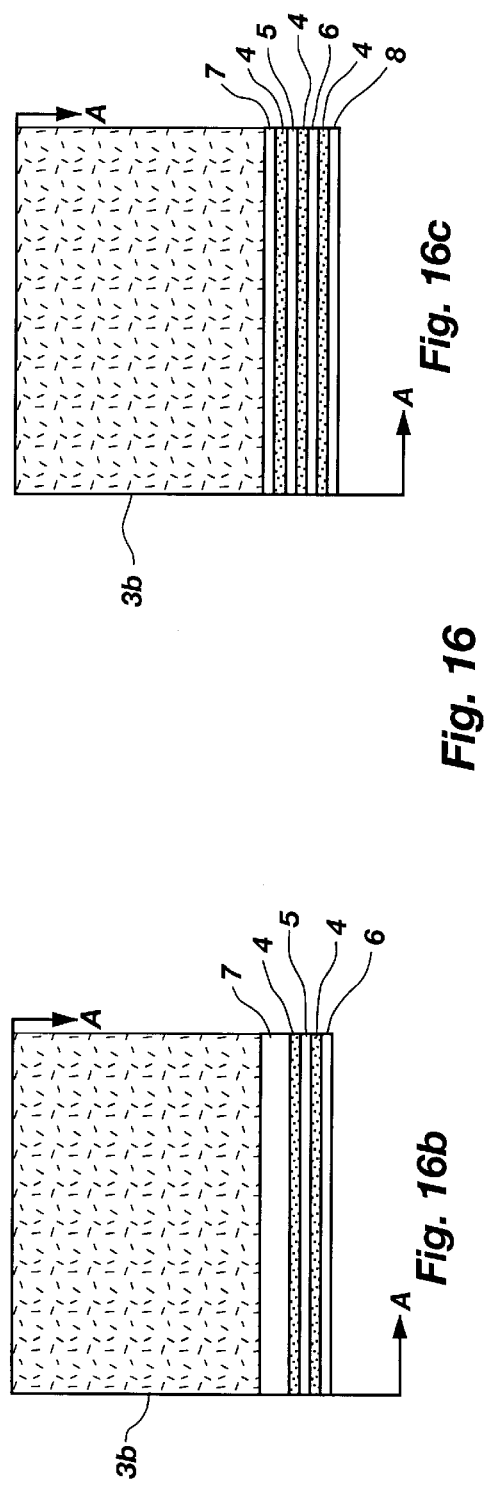
Fig. 16

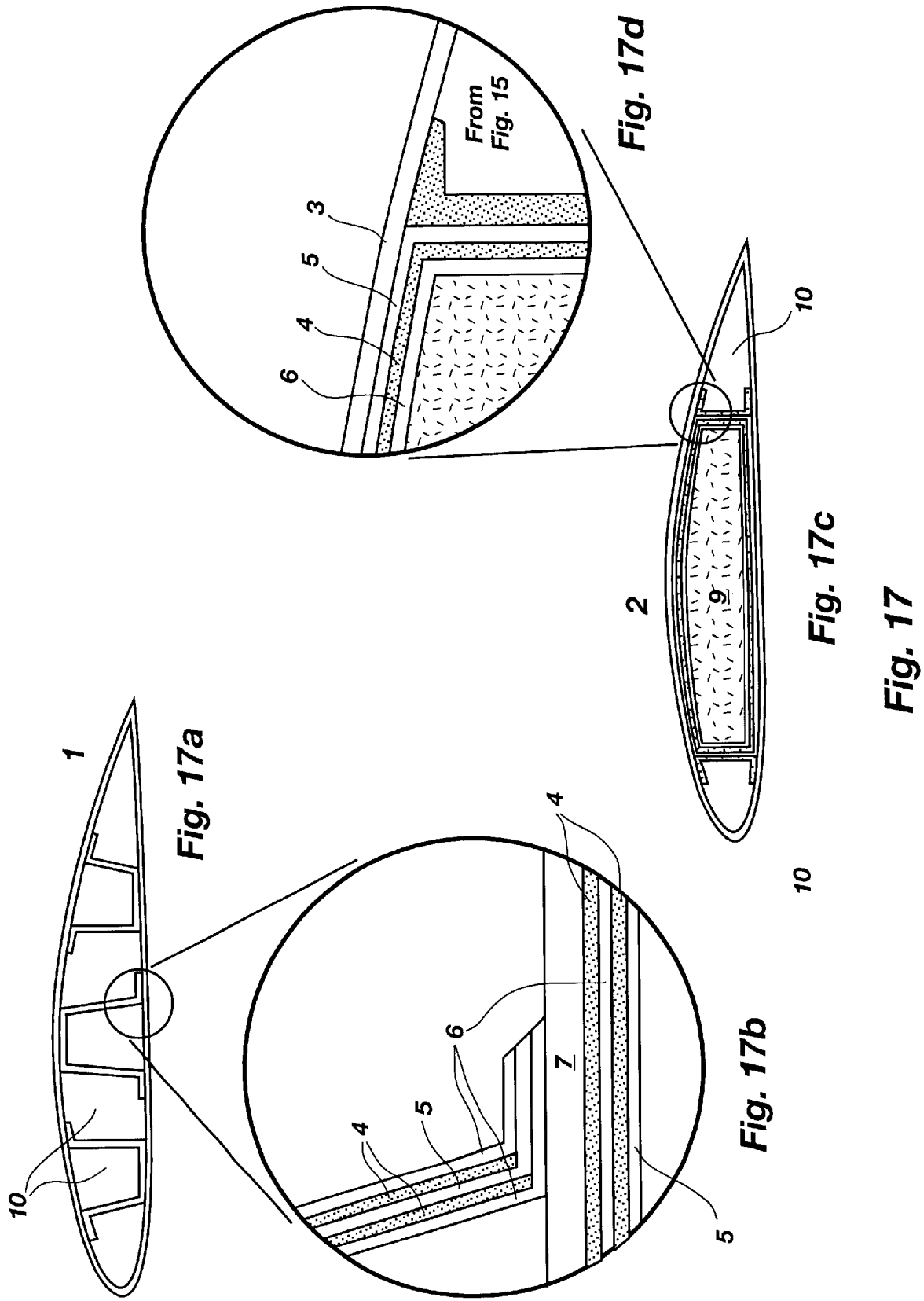

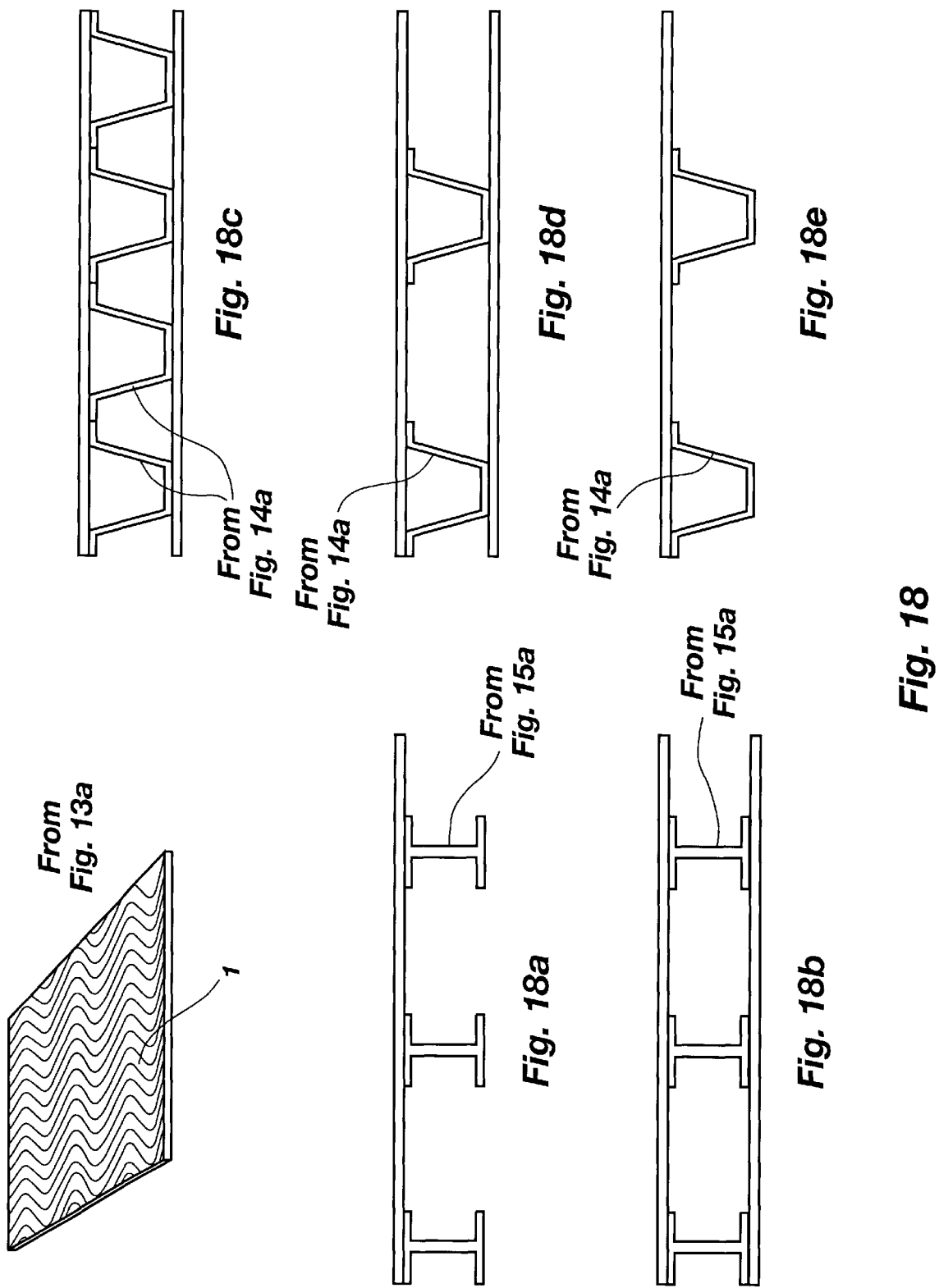

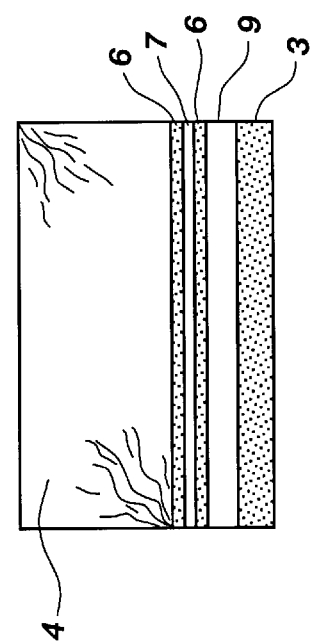
*Fig. 19a*
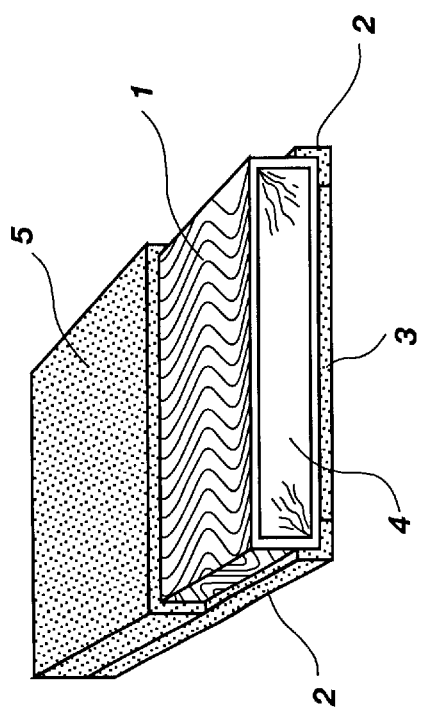
*Fig. 19b*
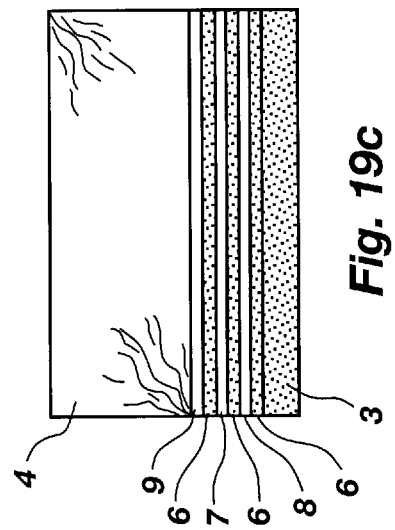
*Fig. 19c*
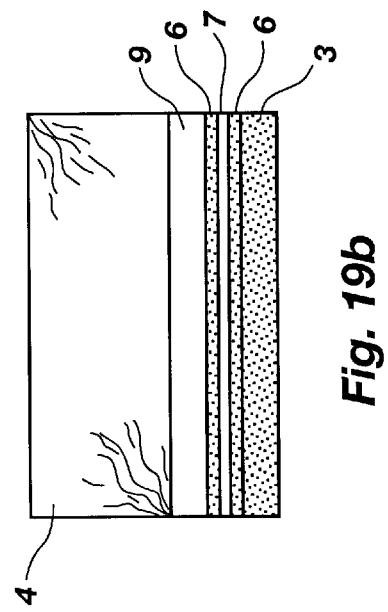
*Fig. 19d*
*Fig. 19*

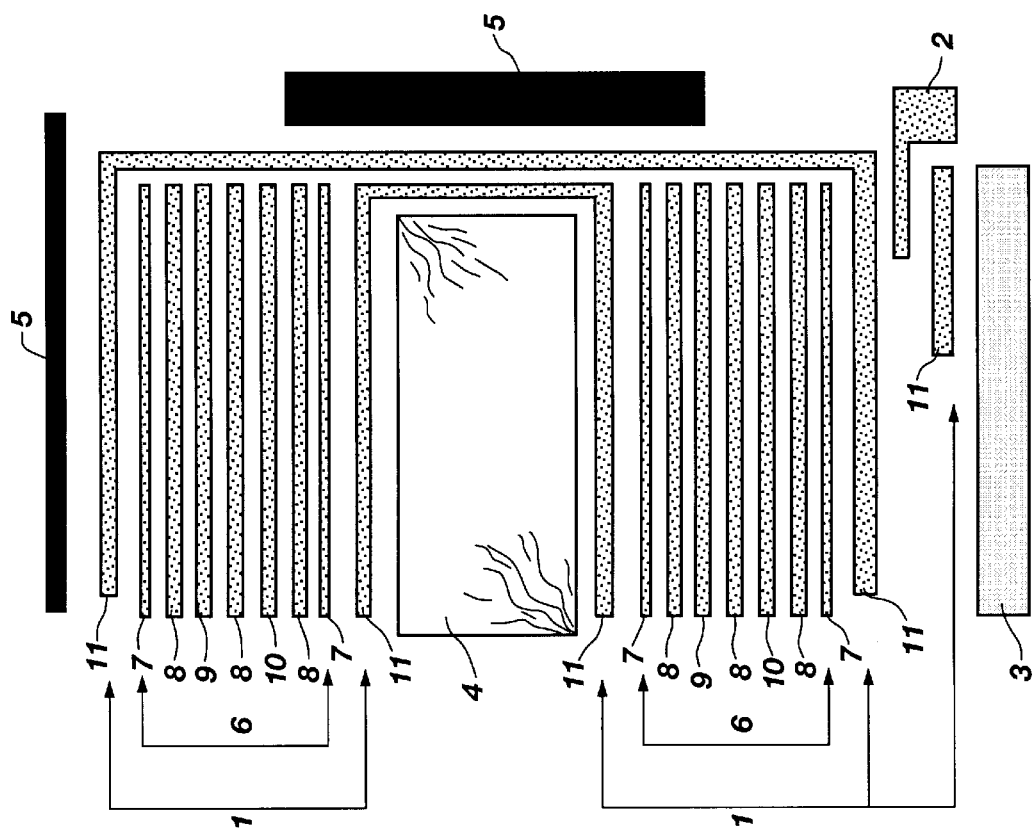
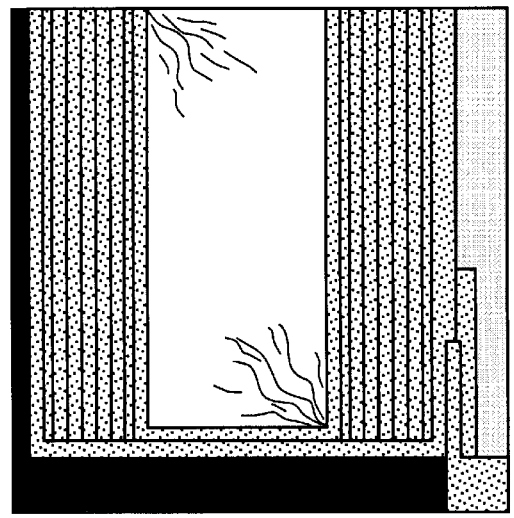
Fig. 20a
Fig. 20b
Fig. 20

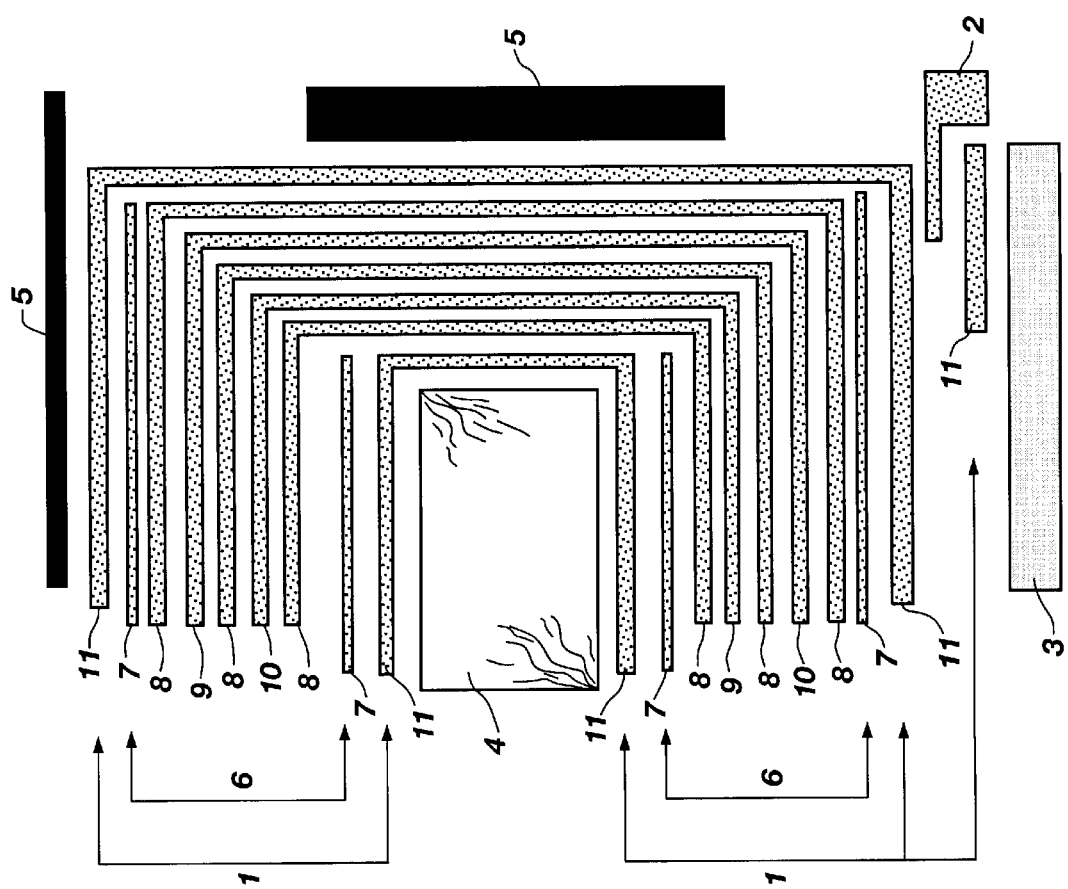
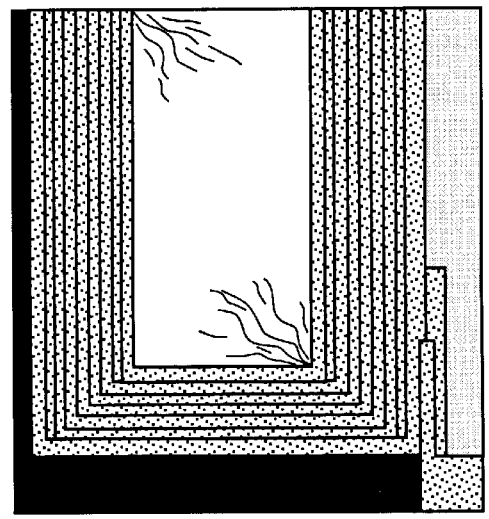
Fig. 21a
Fig. 21b
Fig. 21

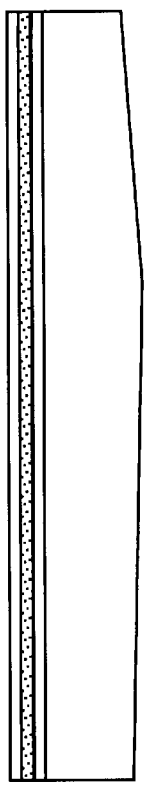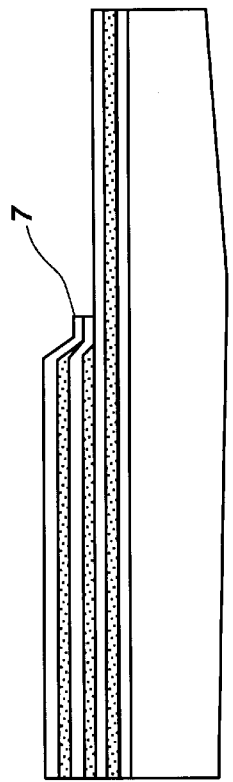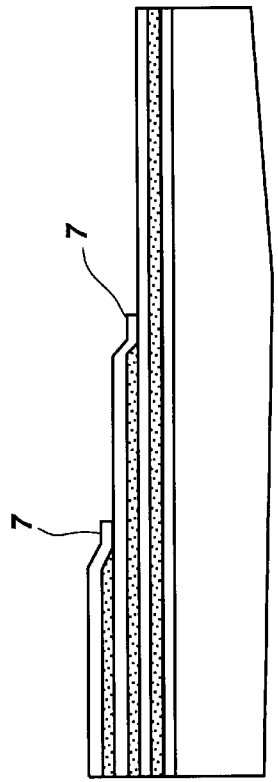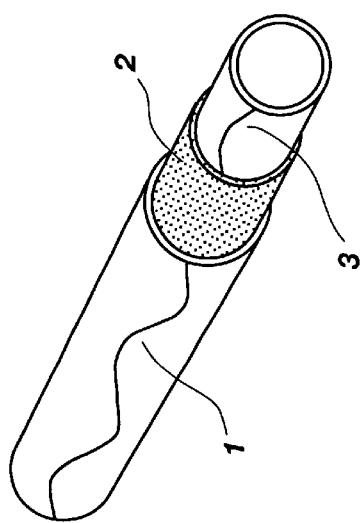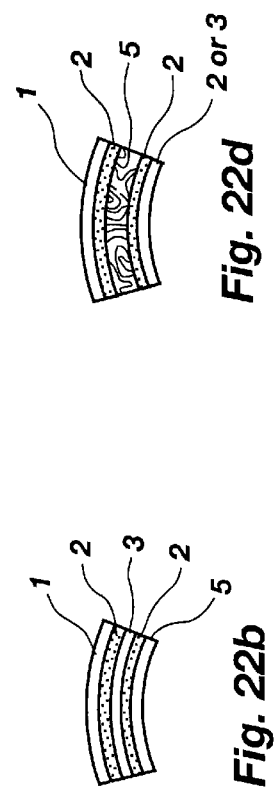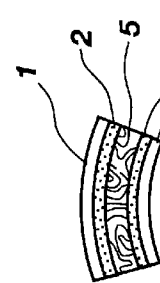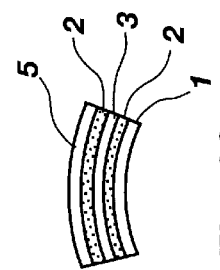
Fig. 22

CONTINUOUS WAVE COMPOSITE VISCOELASTIC ELEMENTS AND STRUCTURES

CROSS-REFERENCE TO RELATED APPLICATION

This is a continuation-in-part of U.S. application Ser. No. 08/970,141 now U.S. Pat. No. 6,048,426, filed on Nov. 14, 1997 and also a continuation-in-part of copending U.S. provisional application Serial No. 60/072,975, filed on Jan. 29, 1998.

BACKGROUND OF THE INVENTION

Field of the Invention

The control of noise and vibration in composite structures is an important area of current research in aerospace, automotive and other industries. For example, spacecraft vibrations initiated by attitude adjusting thrusters, motors and thermally induced stresses inhibit accurate aiming of antennas and other equipment carried by the craft. Such vibrations can cause severe damage to the craft and its associated equipment. Fatigue failure of structural components can occur at stresses well below static load limits.

Traditional passive noise and vibration control methods are heavy, bulky, and perform only marginally. For example, the acoustics of aerospace vehicles during launch are severe enough to cause damage to payloads and guidance control systems and could cause failure of the mission. Typically, standard metallic and composite technologies rely upon the use of heavy acoustic blankets to reduce the damaging effects of sound pressure fields during launch. Structurally amplified acoustic and vibration energy exacerbates the problem due to low inherent damping in fairings and other structural components. A practical way of increasing damping and improving acoustic properties in mechanical structures is required.

Composite materials have been used to construct a wide variety of structural elements, including tubes, enclosures, beams, plates and irregular shapes. Objects as diverse as rocket motor housings and sporting goods, notably skis, archery arrows, vaulting poles and tennis rackets have been structured from composite materials. While composite constructions have offered many significant advantages, such as excellent strength and stiffness properties, together with light weight, the poor vibration damping properties of such construction have been of concern.

The invention relates to fiber reinforced composite structures and applications that use wavy fiber patterns in the plane of the laminate, and that increase damping with little or no sacrifice in strength.

The invention also relates to the methods and apparatus for manufacturing the aforementioned composite material structures.

Another aspect of the invention is directed toward the fabrication of a wavy fiber pre-preg (fibers preimpregnated with epoxy resin). Such pre-pregs not only have an aesthetic appeal but also may be fabricated with selected variable volume fractions to accommodate a variety of applications.

Description of Related Art

The following terms used herein will be understood to have their ordinary dictionary meaning as follows:

Fiber: a thread or a structure or object resembling a thread. A slender and greatly elongated natural or synthetic filament. (Includes metal fibers)

Matrix: material in which something is enclosed or embedded.

Viscoelastic: having appreciable and conjoint viscous and elastic properties. Note: a special case of the term "viscoelastic" is "Anisotropic Viscoelastic", defined below. When the term viscoelastic is used in the following text it should be construed to encompass this special case.

Lamina(te): a thin plate . . . LAYER(S)

Composite: made up of distinct parts.

CWC: (Continuous Wave Composite) defines any fiber-matrix combination having at least one fiber without a break (or interruption) and having a pattern which can be defined by a mathematical algorithm. It generally has a wavy appearance. It can consist of "unidirectional" fibers (although in this case the fibers would be placed in a wavy pattern) or woven cloth (which also will have a wavy pattern to the warp or weft).

CWCV: (Continuous Wave Composite Viscoelastic) defines a combination of CWC and viscoelastic materials designed to induce damping in a structure.

CWC-AV: (Anisotropic Viscoelastic) defines a viscoelastic material or matrix with an embedded wavy fiber pattern. Such a material would have anisotropic, elastic, and viscoelastic properties. It is a special case of both CWC laminates and "viscoelastic" and can be used in conjunction with conventional CWC fiber-matrix combinations to provide damping and unique structural properties. Any use of "CWC" or "viscoelastic" in the following text can be construed to encompass this special case.

One of the simplest and often very effective passive damping treatments involves the use of thermo-viscoelastic (TVE) materials. These materials, represented by Avery-Dennison's FT series (FT-1191 is one example), exhibit both elastic and dissipative qualities which make them useful in a number of passive damping treatments.

Some of the first uses of thermo-viscoelastic materials to increase structural damping involved the use of surface patches of aluminum foil and viscoelastic adhesives. Called constrained or embedded-layer damping, these methods produce modest gains in damping.

One of the more common passive damping methods, Constrained Layer Damping or CLD (Kerwin, 1959), is achieved by bonding a thin layer of metal sheet, usually aluminum, to an existing structure with a viscoelastic adhesive. Shear strains develop in the viscoelastic material when the original structure bends or extends. Damping occurs when the deformation of the viscoelastic adhesive creates internal friction in the viscoelastic material, generating heat and thus dissipating energy.

Compared to an undamped structure, this approach, is modestly successful but its effectiveness decreases markedly as the ratio of the thickness of the base structure to the thickness of the viscoelastic material increases (Hwang and Gibson, 1992). Thus surface treatments alone cannot provide significant levels of damping to structural members where greater strength and stiffness are important. Hwang and Gibson (1992) reported this problem and showed that the advantage of aluminum foil viscoelastic constrained layer damping was eclipsed by the inherent damping in conventional composites when the required thickness of the structure exceeds about eight millimeters 0.3 inches). They determined that a ±45° graphite/epoxy composite provided approximately uniform damping of about 1.5% in thick sections, that was at least one order of magnitude greater than comparable aluminum structures.

Co-cured composite-viscoelastic structures are formed when layers of uncured fiber composites and TVE (thermal-viscoelastic or viscoelastic) materials are alternately stacked and cured together in an oven. Damping occurs in these structures when a load causes differential movement of the opposing laminates, causing shearing in the sandwiched viscoelastic material. The various methods that use this concept of differential shearing of the viscoelastic material can be classified by the fiber orientation methods used to induce damping in the TVE material.

Conventional angled ply composite designs use ±θ lay-ups of straight fiber pre-preg materials to encase the viscoelastic layers, and were first proposed by Barrett (1989) in a design for damped composite tubular components. Barrett combined the concepts of constrained layer damping with anisotropic shear coupling in the constraining composite layers to create a tube that achieved both high damping and high axial stiffness. Barrett's research showed that maximum shearing was experienced at the ends of the tubes and that clamping the constraining layers of the tube at the ends eliminated much of the damping effect, rendering the design impractical for most applications.

Chevron patterned designs also use conventional angled ply (±θ) composite lay-ups of straight fibers but vary the fiber orientation several times throughout the structure in a given laminate. Called SCAD (Stress Coupled Activated Damping), it was first proposed by Benjamin Dolgin of NASA and implemented by Olcott et al. (1991a).

In Olcott's implementation of Dolgin's design, each composite layer is comprised of multiple plies of pre-preg composite material arranged in a series of chevron-like patterns. Each composite layer is also comprised of several "segments" of material where the fiber angle in a given segment is oriented in a single direction throughout its thickness. Segments on opposite sides of the embedded viscoelastic material have the opposite angular orientation. At least two adjacent segments in a given composite layer are required to form a chevron and are joined together by staggering and overlapping the pre-preg plies in the segment.

By tailoring the fiber angle, thickness, and segment lengths, significant shearing in the viscoelastic layer was observed over the entire structure, not just at the ends as in Barrett's design (Olcott et al., 1991b; Olcott, 1992).

Olcott's research showed that the fiber orientation, segment length, segment overlap length, material choice, and material thickness, had to be carefully controlled to maximize damping in a structure (Olcott, 1992). His best design, built and tested, was a 51 cm (20 inch) tube that used a fiber lay of ±25° and a segment length of 3.8 cm (1.5 inches). This single damping layer tube produced almost 9% damping in the axial mode. Olcott also experimented with the use of chevron damping patterns in the flanges of a composite "I" beam with good success [Olcott, 1992 #19].

Pratt, et. al. [Pratt, 1997 #105] proposed several processes for making the wavy composites contemplated by Dolgin, their use in combination with viscoelastic materials for increased damping in composite structures, and the manufacture and use of several specialized wave forms.

General Description

The composite structures of this invention may take a variety of forms, including plates with or without stiffeners, beams, curved surfaces, or irregular shapes. In any event, each structure has at least one CWC laminate and at least one viscoelastic layer. The viscoclastic layer need not be a separate material or layer but may be formed by a thin boundary layer of matrix from the composite during curing; such a CWC material would of course have a special matrix.

Damping is induced in the structure primarily by the differential shearing of the viscoelastic layer by the CWC laminate. This shearing induces elongation of the long chain polymers in the viscoelastic which in turn generates heat, causing energy loss in the structure. This energy loss accounts for the primary source of damping in the structure.

There remains a need for a composite structure capable of diverse configuration with improved damping characteristics and which avoids the limitations of the structural approaches heretofore suggested for use with composite materials.

SUMMARY OF THE INVENTION

The terminology CWC (continuous wave composite) will be used to define any fiber-matrix combination having at least one fiber without a break (or interruption) and having a pattern which can be defined by a mathematical algorithm. Typically, such curves have $G^1$ geometric continuity. A fourier series expansion is a mathematical algorithm which can, in general, be used to define nearly any desired shape such as a pseudo random, square wave, straight line, triangular wave or any of the shapes shown in FIGS. 1–6.

The terminology CWCV (continuous wave composite viscoelastic) will be used to define a composite structure which uses at least one layer of CWC material having viscoelastic properties (or 'anisotropic viscoelastic'); or at least one layer of CWC material combined with at least one layer of viscoelastic material either in a sandwich construction or adjacent construction.

A CWCV is defined by specifying the angle of the fiber lay along the composite layers (e.g. the orientation angles of the fiber with respect to the loading direction), the thickness of the composite layers, and the number of composite and viscoelastic layers in the structure.

The lay of fiber in a CWCV composite layer is varied continuously in a periodic wavelike form. A simple sinusoid wave form may be used, however, other wave forms which may or may not be periodic may also be used. It is also envisioned to employ an optimal wave form for damping particular vibration frequencies at particular locations of a structure.

The ends of a CWCV structure according to the present invention may be restrained without significantly reducing the overall damping properties of the structure. There results a structural element possessing high axial stiffness and low weight. The structural elements of this invention offer markedly superior damping capabilities but are nevertheless useable with simple attachment fixtures and methods.

Damping is induced in the structure primarily by the differential shearing of the viscoelastic layer by the CWC laminate. This shearing induces elongation of the long chain polymers in the viscoelastic which in turn generates heat, causing energy loss in the structure. This energy loss accounts for the primary source of damping in the structure.

The invention also includes fiber patterns which change their wavelength and/or waveform along the loading direction. The inventor has discovered that for a given frequency and temperature many viscoelastic adhesives will require an optimal wavelength to maximize damping in the structure. While a structure with a constant wavelength can be optimized for a given frequency and/or temperature, placement of a changing wavelength or waveform can optimize a structure for a broader range of frequencies and/or temperatures.

Stress coupled composite structures having one fiber angle at any given point along the loading direction are not able to withstand as much stress as one having multiple angles contained within a matrix. This is because failures occur in composite materials starting at areas of maximum in-plane shear stress in the composite layer, and propagate in the matrix material along the fiber direction.

The present invention further envisions complex fiber patterns, such as those shown in FIGS. 2–4, generated by an algorithm for optimizing pattern and/or shape, wave period, wave amplitude, structural stiffness, and structural damping. Using techniques similar to electronic signal processing, wave forms can be generated algorithmically which vary wave patterns by mixing two or more algorithmically defined waves with one or more differences in shape, period, amplitude, etc. For example:

A period modulated wave shape where two or more waves of differing period with or without the same amplitude, combined into one composite shape. This could be used to optimize damping and/or stiffness in complex structures where modal vibration and/or forcing functions require special design considerations.

An amplitude modulated wave shape could be used to modify stiffness and damping properties at varying positions in the structure.

A wave shape composed of two or more similar or dissimilar wave forms of different periods such that the combined wave form shows a mixed characteristic of all such combined waves. This would allow tailoring of structural properties for multiple modes and forcing functions.

A bessel based wave shape, a fourier series driven shape, sawtooth, trapezoidal, square wave, and modulated (by other similar or dissimilar wave forms) patterns.

Optimized patterns not necessarily algorithmically driven which are tailored by an optimization program to provide special structural response characteristics.

Random and/or neo-random patterns, and patterns which are a mixture of random or neo-random and periodic wave shapes.

A structure which uses conventional straight fiber composites to constrain an anisotropic viscoelastic material.

It has been shown that higher frequency resonance or forcing functions require shorter wave periods for optimization of damping in CWCV structures. See, for example, the following publications incorporated herein by reference:

1. Pratt, W. F., Rotz, C. A. and Jensen, C. G. 1996 "Improved Damping and Stiffness in Composite Structures Using Geometric Fiber Wave Patterns," Proceedings of the ASME Noise Control and Acoustics Division, Vol. NCA 23-2, pp. 37–43.
2. Pratt, W. F., Rotz, C. A., and Jensen, C. G., 1996, "On the Use of Continuous Wave Composite, Structures in Stress Coupled Interlaminar Damping," Advanced Materials: Development, Characterization Processing, and Mechanical Behavior Book of Abstracts, Vol. MD 74, pp. 63–64.
3. Pratt, W. F., Rotz, C. A., and Jensen, C. G., 1996, "On the Use of Continuous Wave-like Geometric Fiber Patterns in Composite Structures to Improve Structural Damping," Proceedings of the ASME Aerospace Division, Vol. AD 52, pp. 415–433.

In summary, a continuous wave fiber composite material according to the present invention may include one or more anisotropic composite layers with or without viscoelastic properties, and therefore respectively used without or with a separate viscoelastic layer. Of course, one may also utilize composite layers with viscoelastic properties (i.e., the viscoelastic material may comprise all or part of the matrix material binding the fibers) and separate viscoelastic layers as well. Features of the pattern of reinforcing fibers may include:

A constant wavelength and/or waveform (see FIG. 1);

A wavelength and/or waveform that varies along the length of the structure (see FIG. 2);

A pattern in one CWC laminae having multiple wavelengths and/or waveforms (see FIG. 4); and Multiple combinations of CWC laminae and viscoelastic layers using one or more of the above features (see FIGS. 3 and 5).

In a further aspect of the present invention, an apparatus and method for manufacturing composite materials such as those described above are also envisioned.

Generally, characteristics of the processes and machines include:

laying the fiber(s) in a controlled pattern which can be periodic or non-periodic;

producing a fiber reinforced composite material consisting of matrices containing continuous fibers. The matrices can consist of conventional polymers, viscoelastic materials, or more exotic materials including (but not limited to) metal, ceramic, or combinations of materials. The fibers can consist of unidirectional tow or woven mats.

The present invention is directed to the use of wavy composite and damping materials in basic structural components typically representing parts of panels, plates, and beams.

The invention is also directed to a CWC (continuous wave composite) which forms a continuously wavy pre-preg for use with or without a separate viscoelastic layer.

In both the CWCV and CWC structures, the wavy characteristic of the fiber is optimally varied in at least one of a period, amplitude or shape characteristic.

In accordance with another aspect of the invention, there is provided a fiber reinforced viscoelastic tape with may be used in many diverse applications.

The invention is also directed to the use of basic wavy composite damping structural components to form specific practical devices and applications.

The present invention is directed to "continuous wave composite viscoelastic" (CWCV) structures, as well as the methods and apparatus of manufacturing them.

The composite structures of this invention may take a variety of forms, including tubes, plates, beams or other regular or irregular shapes. In any event, a typical structure will at a minimum include a first stiffness layer or matrix, a damping material, and a second stiffness layer or matrix. Each stiffness layer or matrix will include at least one reinforcing fiber and will be at least several thousandths of an inch thick. Layers with multiple plies and of much greater thickness; e.g. several inches, are envisioned. The fibers of a multi-ply layer may be of similar or dissimilar orientation. The damping material may be of any appropriate thickness, depending upon the application involved, as well as the properties of the damping material selected. The damping material may comprise another layer interposed between the stiffness layers, or may be incorporated into the stiffness layer. Typically, the damping material will be as thin as is practical, to avoid adding excess weight to the structure. It is not unusual, however for a layer of damping material to exceed in thickness the total thickness of the stiffness layers. The stiffness layers may be constructed of any of the reinforcing fibers and matrix materials which would otherwise be appropriate for a particular application. The damping material will ordinarily be selected to provide optimum damping loss at the temperatures and vibrational frequencies expected to be encountered by the composite structure.

BRIEF DESCRIPTION OF THE DRAWINGS

The accompanying drawings (FIGS. 1–12), were incorporated in the original patent and constitute a part of the specifications and preferred embodiment for that invention. They are presented here as reference and further explanation for FIGS. 13–22.

The accompanying drawings (FIGS. 13–21), which are incorporated in and constitute a part of the specification, illustrate preferred embodiments of the invention, and serve to explain the principles of the invention.

Figure 1:
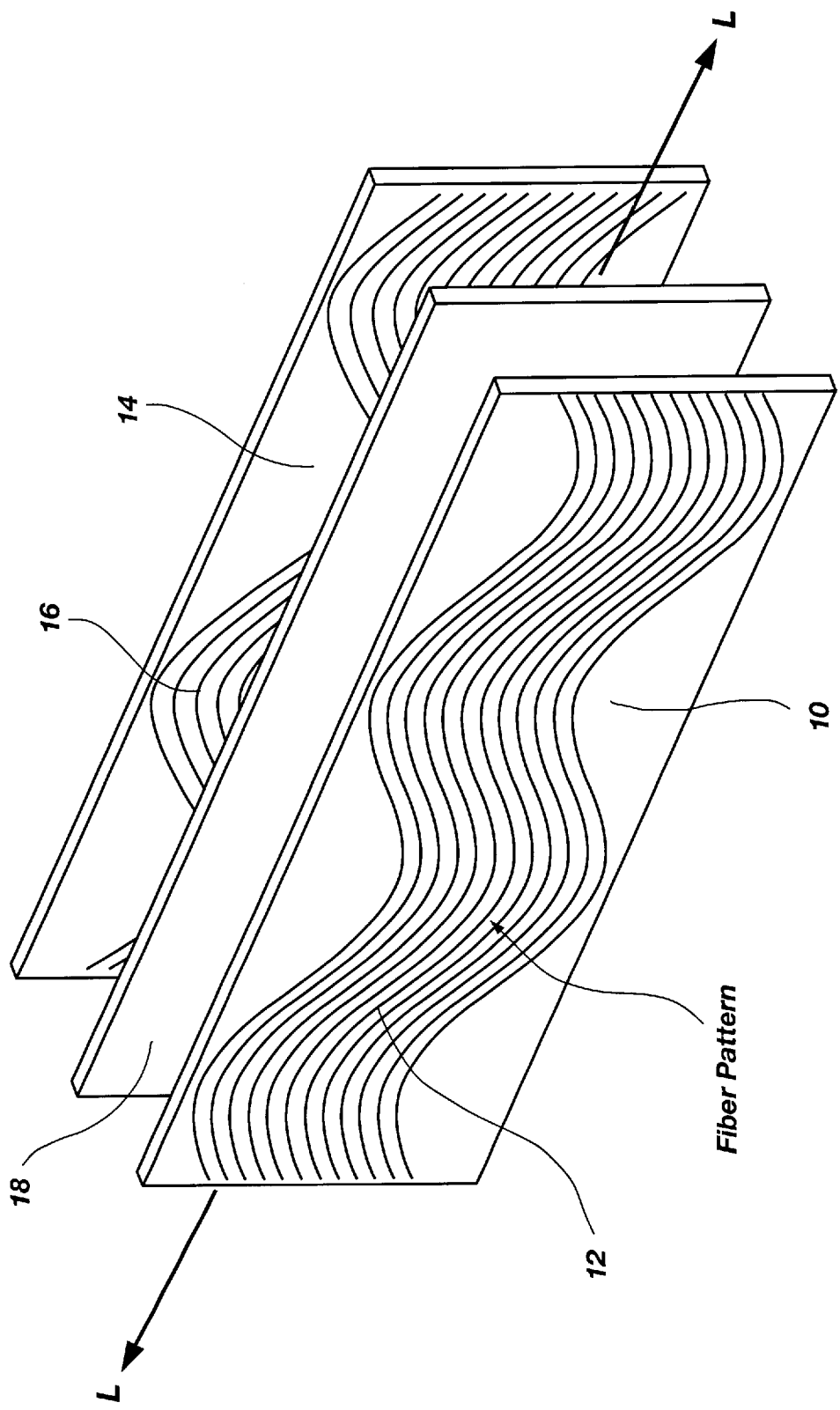
FIG. 1 is an exploded perspective view of a composite material according to a generalized embodiment of the present invention.

FIG. 13 shows a perspective view and series of end views of a CWCV plate, according to an alternate embodiment of the present invention. It is the most basic CWCV laminate building block consisting of opposing waves constraining a viscoelastic layer as shown in FIG. 1.

FIG. 14 shows a perspective view and a series of end views of CWCV plates with damped CWCV hat-stiffeners, according to an alternate embodiment of the present invention.

FIG. 15 shows a perspective view and a series of end views of CWCV structures with damped CWCV laminates and I-beam, C-channel, Z-channel stiffeners, according to an alternate embodiment of the present invention.

FIG. 16 shows a perspective view and a series of end views of CWCV structures with damped CWCV laminates and core materials used to give the structure shape, according to an alternate embodiment of the present invention.

FIG. 17 shows end views of aerodynamically shaped CWCV structures with damped CWCV laminates and CWCV hat-stiffeners, and/or I beam and/or channel stiffeners, according to an alternative embodiment of the present invention.

FIG. 18 shows a perspective view of a CWCV plate and a series of end views of damped CWCV laminates and CWCV structures with CWCV hat-stiffeners or I-beam stiffeners, according to an alternative embodiment of the present invention.

FIG. 19 shows a perspective view and end views of damped CWCV materials used to build a snow ski, water ski, snow board, etc. with damped CWCV laminates on one side, and common core materials, metal edgings, and surface materials, to enhance damping and dynamic properties, according to an alternative embodiment of the present invention.

FIG. 20 shows a perspective view and end views of damped CWCV materials used to build a snow ski, water ski, snow board, etc. with damped CWCV laminates sandwiching a common core material, in addition to metal edgings and surface materials, to enhance damping and dynamic properties, according to an alternative embodiment of the present invention.

FIG. 21 shows a perspective view and end views of damped CWCV materials used to build a snow ski, water ski, snow board, etc. with damped CWCV laminates wrapped around a common core material, in addition to metal edgings and surface materials, to enhance damping and dynamic properties, according to an alternative embodiment of the present invention.

FIG. 22 shows a perspective view and a series of cutaway views of CWCV tubular components with damped CWCV laminates, according to a generalized embodiment of the present invention.

DESCRIPTION OF THE PREFERRED EMBODIMENT

The CWCV shown in FIGS. 13–22 show a fiber pattern that is generally sinusoidal with a constant wave form, period, etc. Since the damping properties are frequency and temperature dependent, and since the selection of an optimal wave shape can be influenced by the desired structural response, a non-periodic, non-sinusoidal wave shape may be the preferred optimal CWC. There are other variables such as selection of materials, relative thickness of laminates, etc., not shown or discussed below that are important for correct design in addition to selection of wave shape, etc. The selection of these details will be necessarily customized for different designs and will be obvious to one skilled in the art. The discussions below are intended to illuminate the general design of CWCV that will be common to most CWCV structures and that will result in optimal strength, damping and stiffness. Therefore, wave shapes, relative sizes and thickness of component laminates, etc., will require analysis by the designer based on the desired structural response. The representations of these design parameters in FIGS. 13 through 22 are exemplary only.

Basic CWCV Plate

The CWCV plate is the most basic unit built with these new materials. It can be shaped and bent to make stiffener building blocks. CWCV plates, stiffeners and cores cab be combined in any combination to form intermediate structural members. The intermediate structural members can be combined with additional CWCV building blocks to form larger structures.

FIG. 13a is a plate with two layers of CWC and an intermediate layer of viscoelastic and represents any combination of waveforms shown in FIGS. 1–5. The CWC layers may be made with bi-directional cloth as well as unidirectional fibers.

Figure 2:
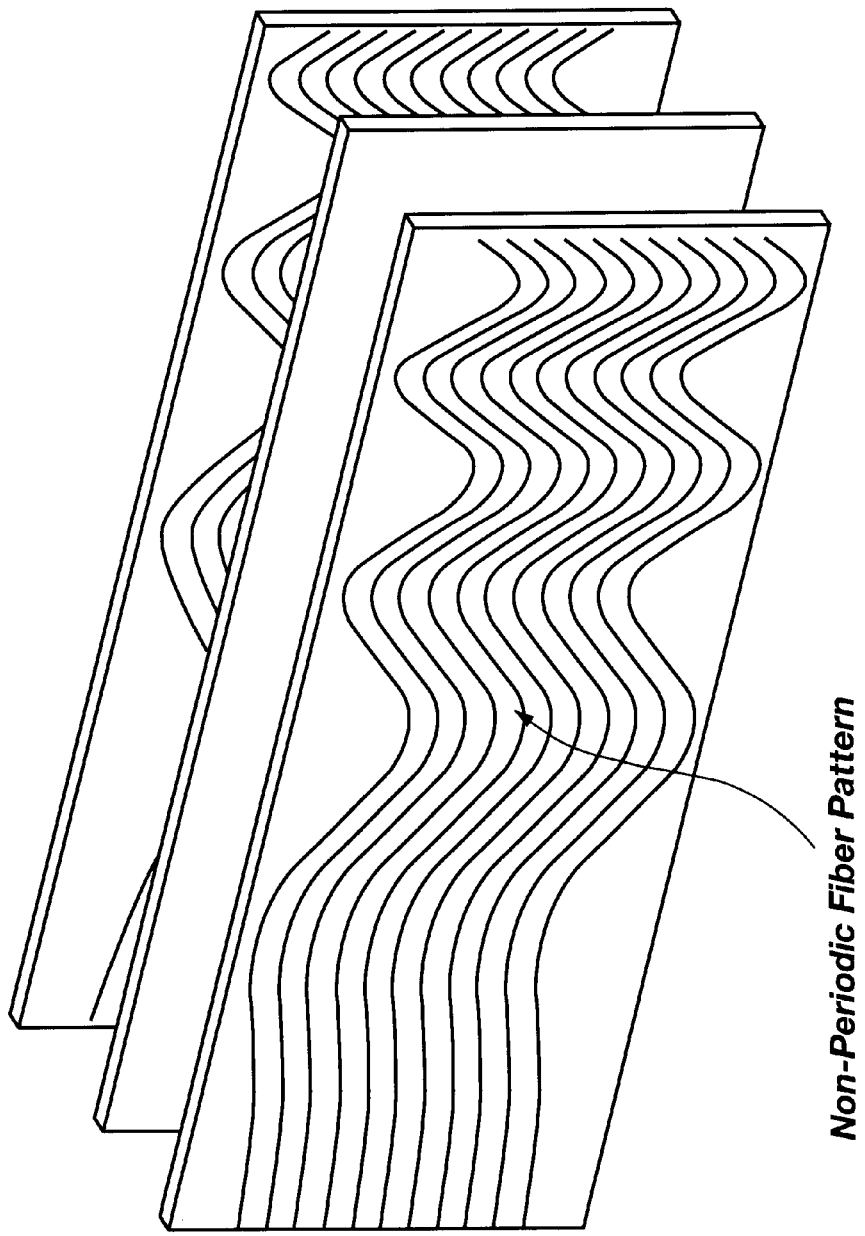
FIG. 2 is an exploded perspective view of a composite material according to an alternate embodiment of the present invention.
Figure 3:
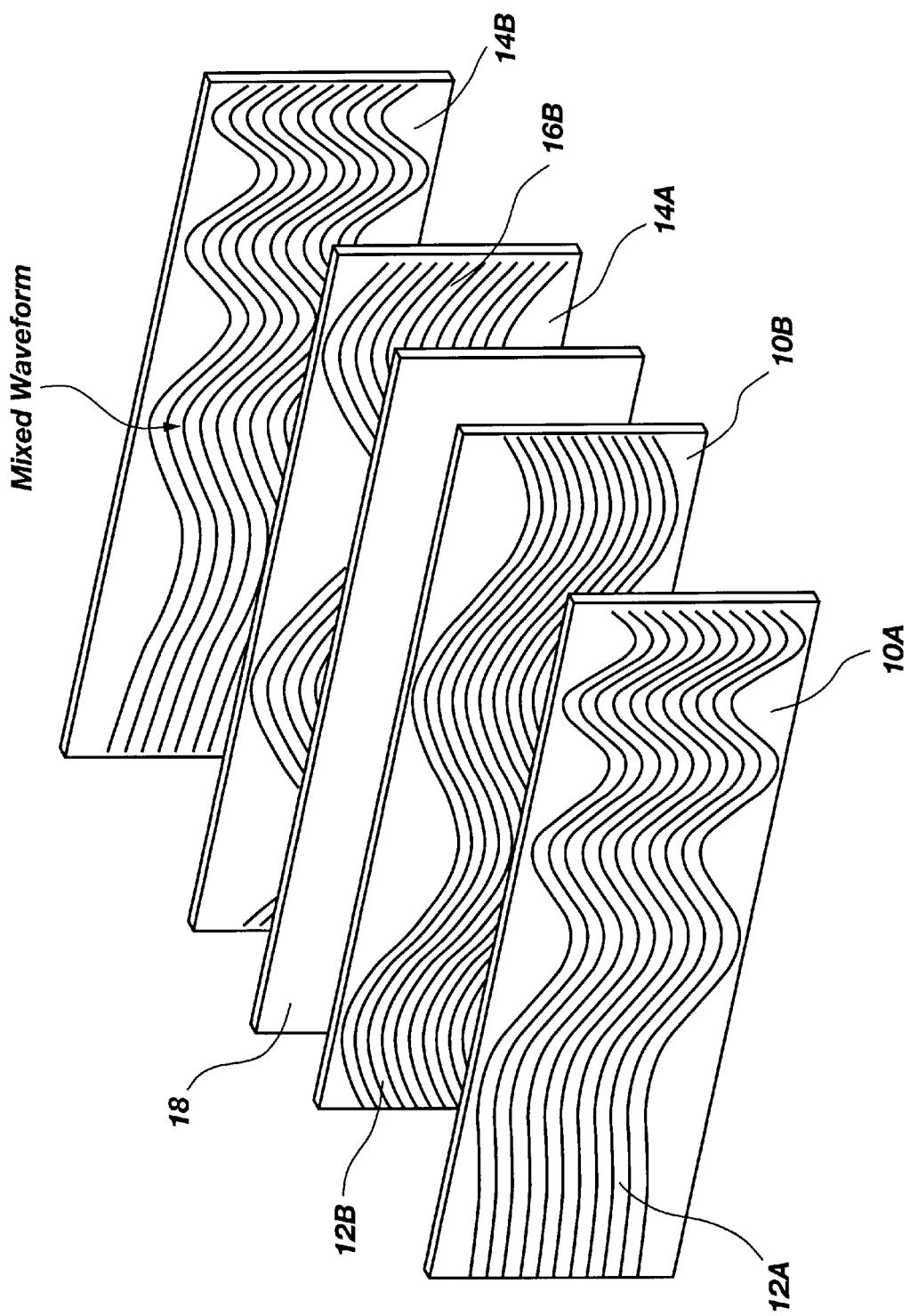
FIG. 3 is an exploded perspective view of a composite material according to another alternate embodiment of the present invention.
Figure 4:
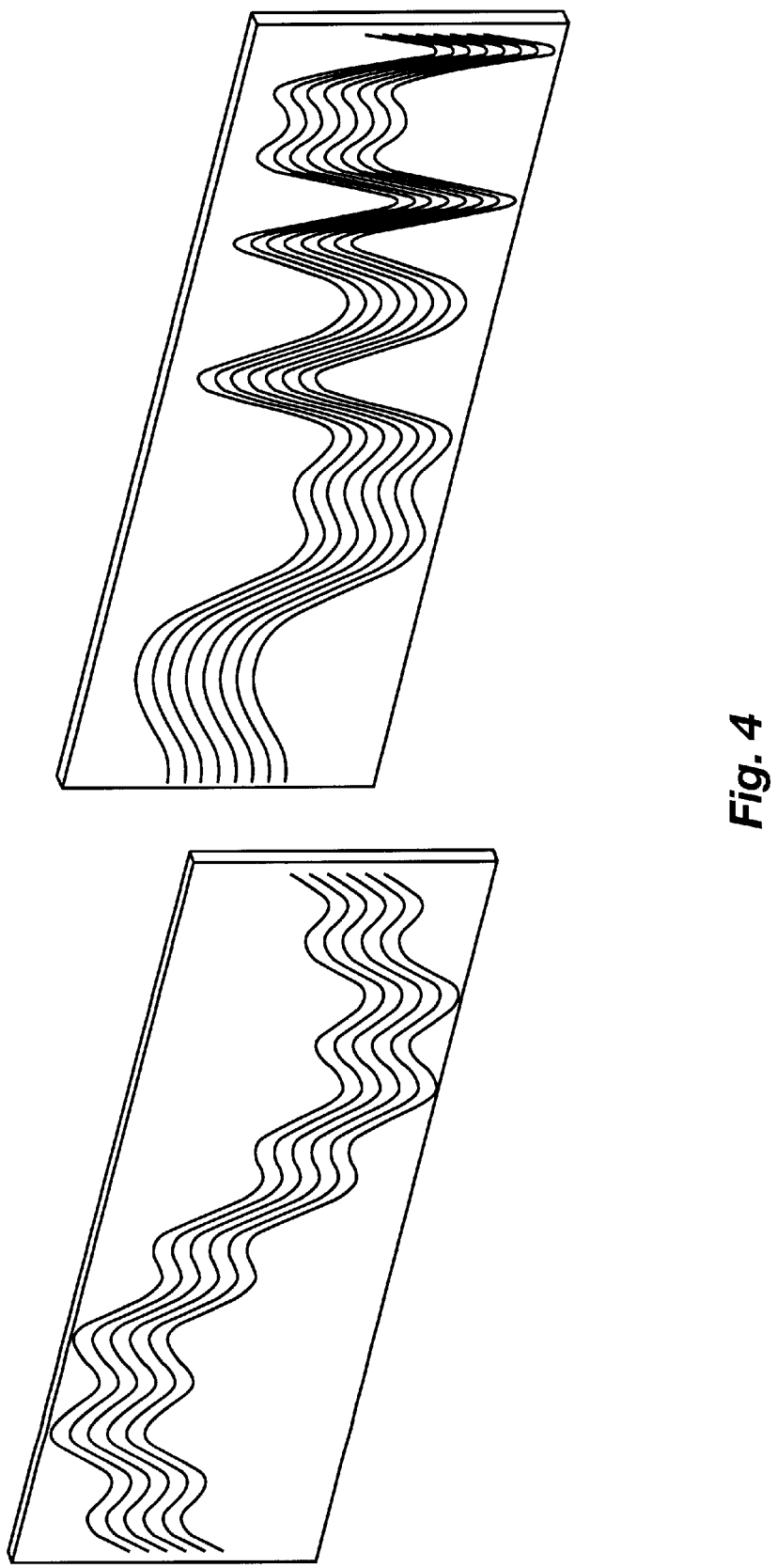
FIG. 4 is a perspective view illustrating two examples of matrices according to yet another embodiment of the present invention.
Figure 5:
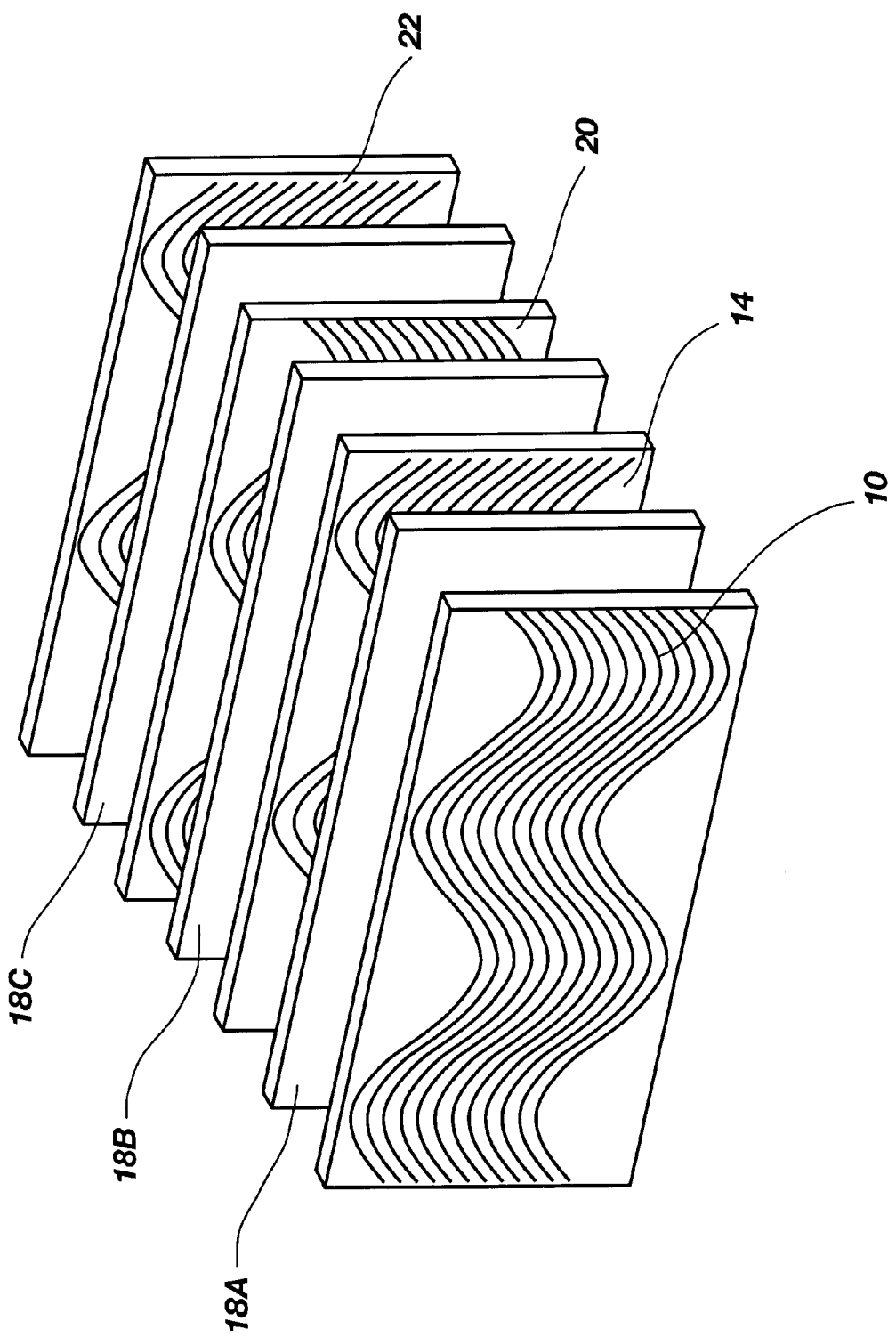
FIG. 5 is an exploded perspective view of a composite material according to yet another alternate embodiment of the present invention.
Figure 6A:
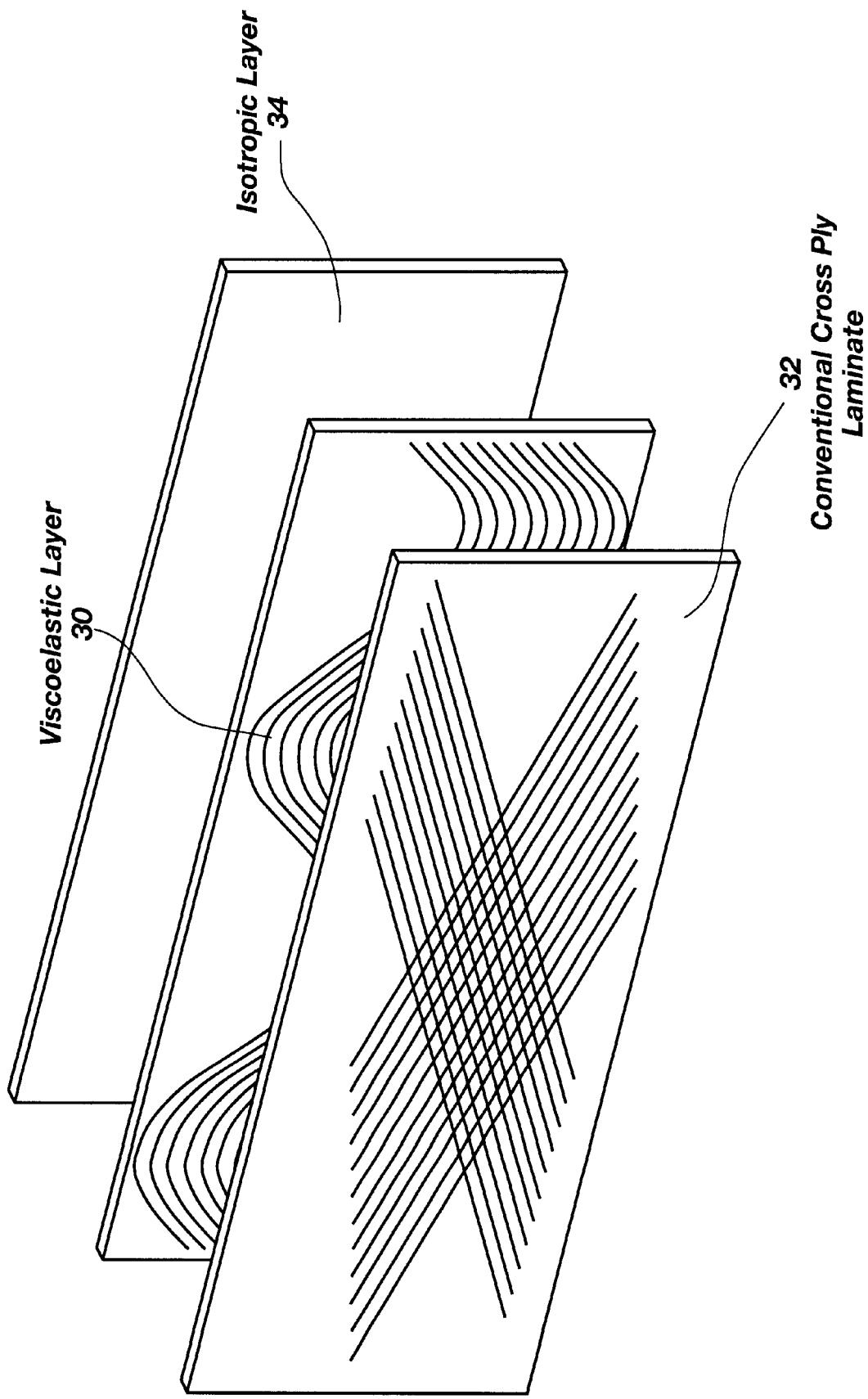
FIGS. 6A, 6B and 6C are exploded perspective view of a composite material and damping layer coupled to an isotropic layer in accordance with another embodiment of the invention.
Figure 6B:
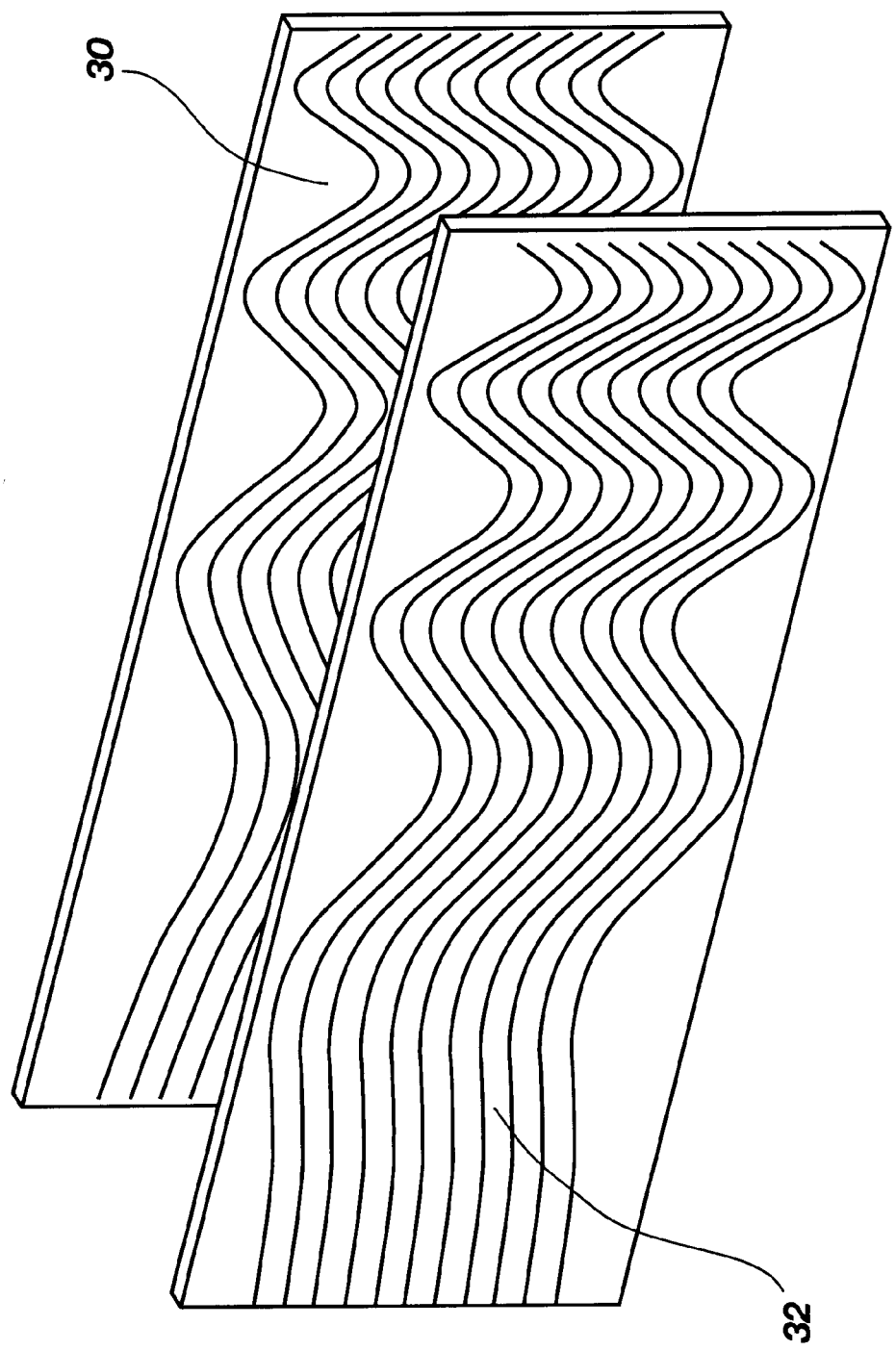
Figure 6C:
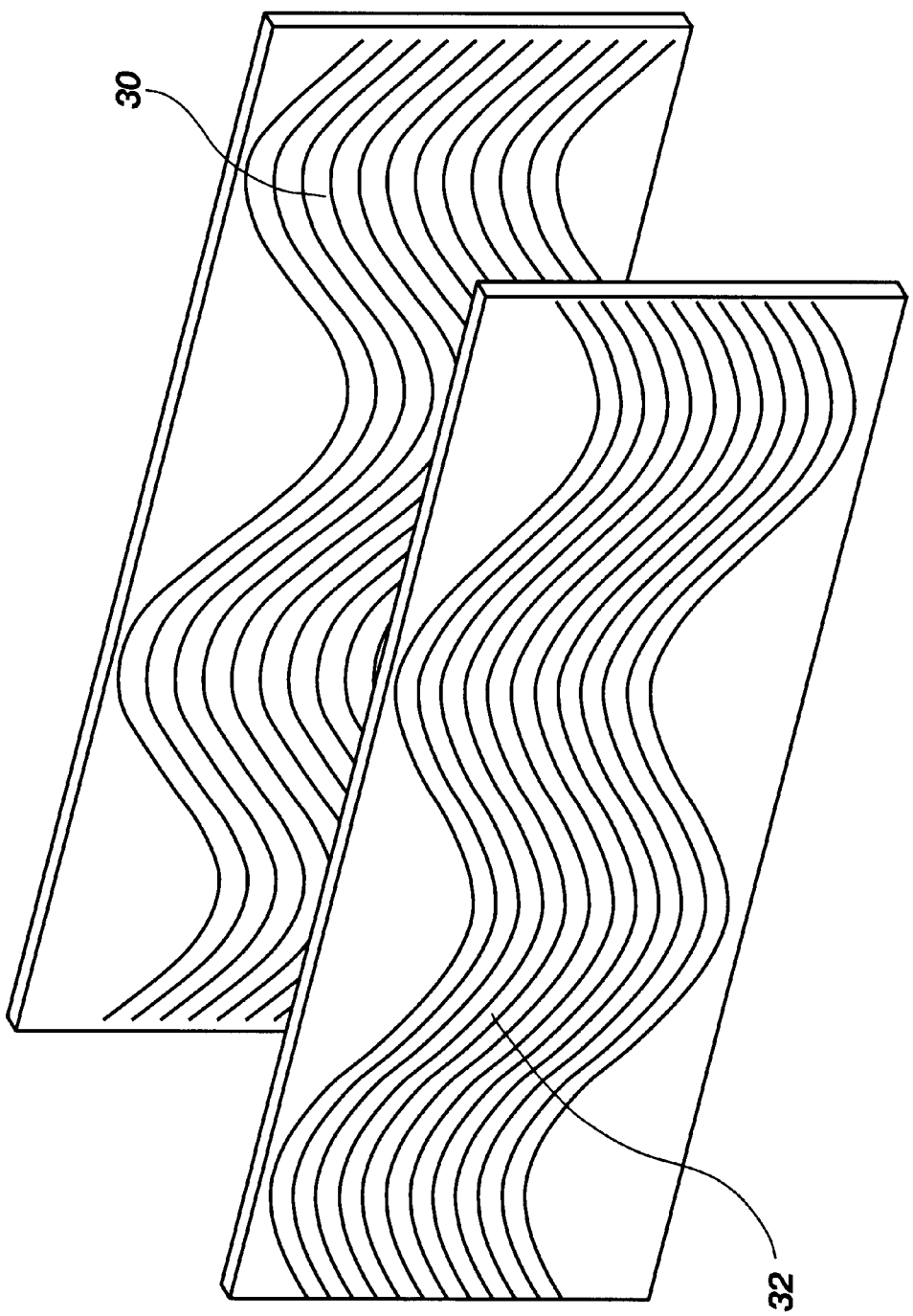
Figure 7:
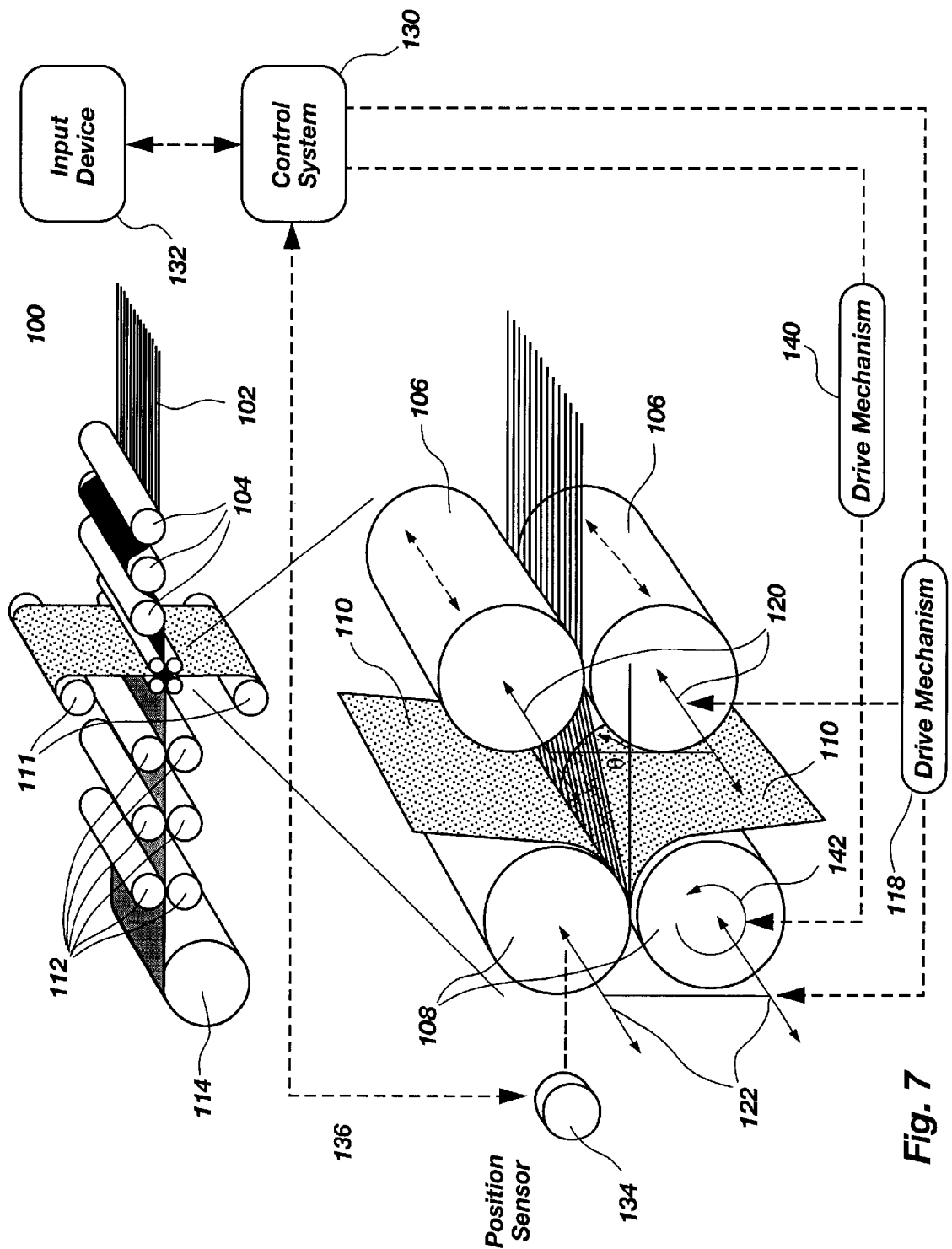
FIG. 7 is a schematic illustration of an apparatus according to the present invention for manufacturing a composite material.
Figures 8A, 8B:
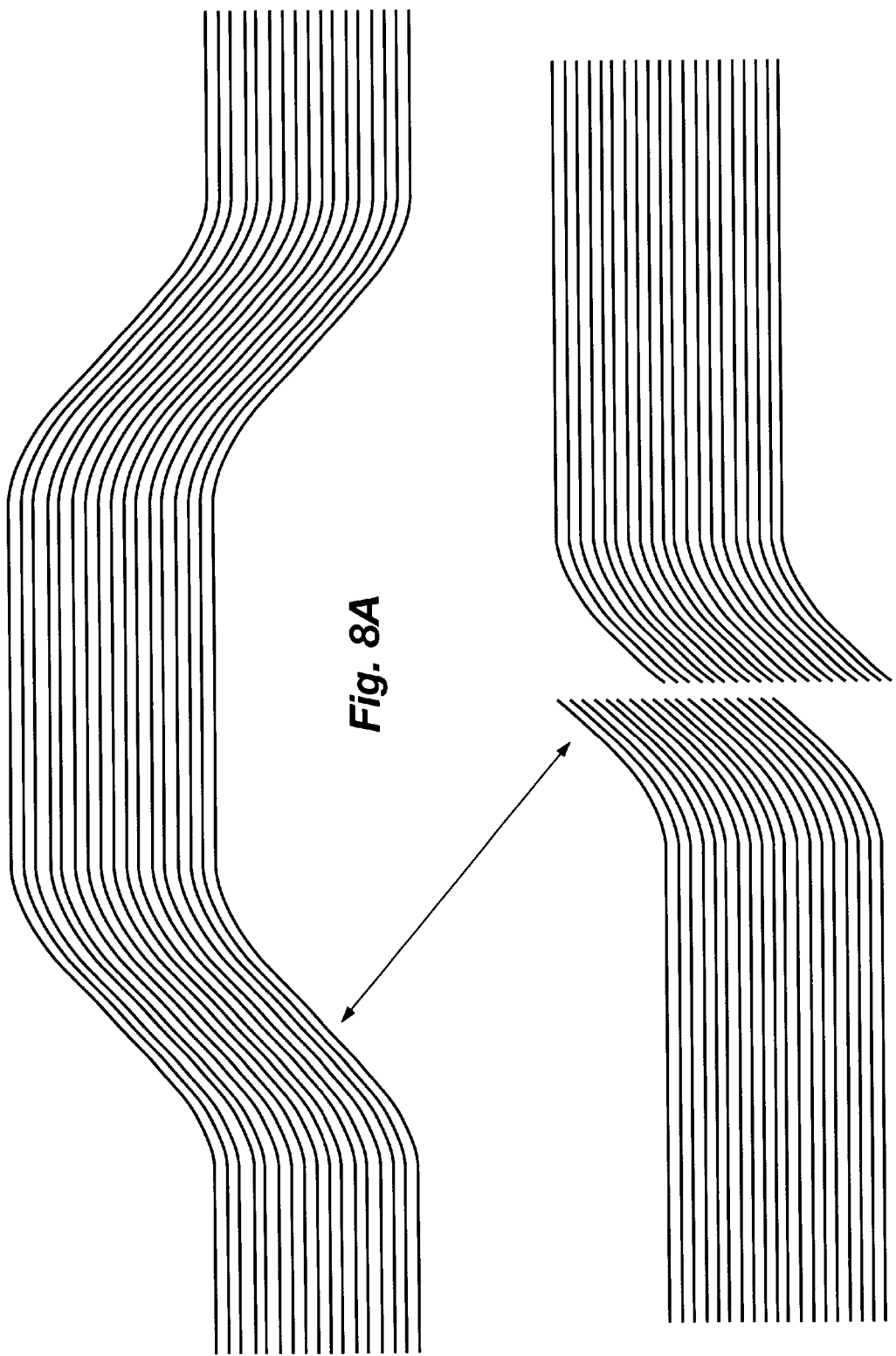
FIGS. 8A and 8B are illustrations of bent fibers showing how the volume fraction is enhances with the use of bending.
Figure 9:
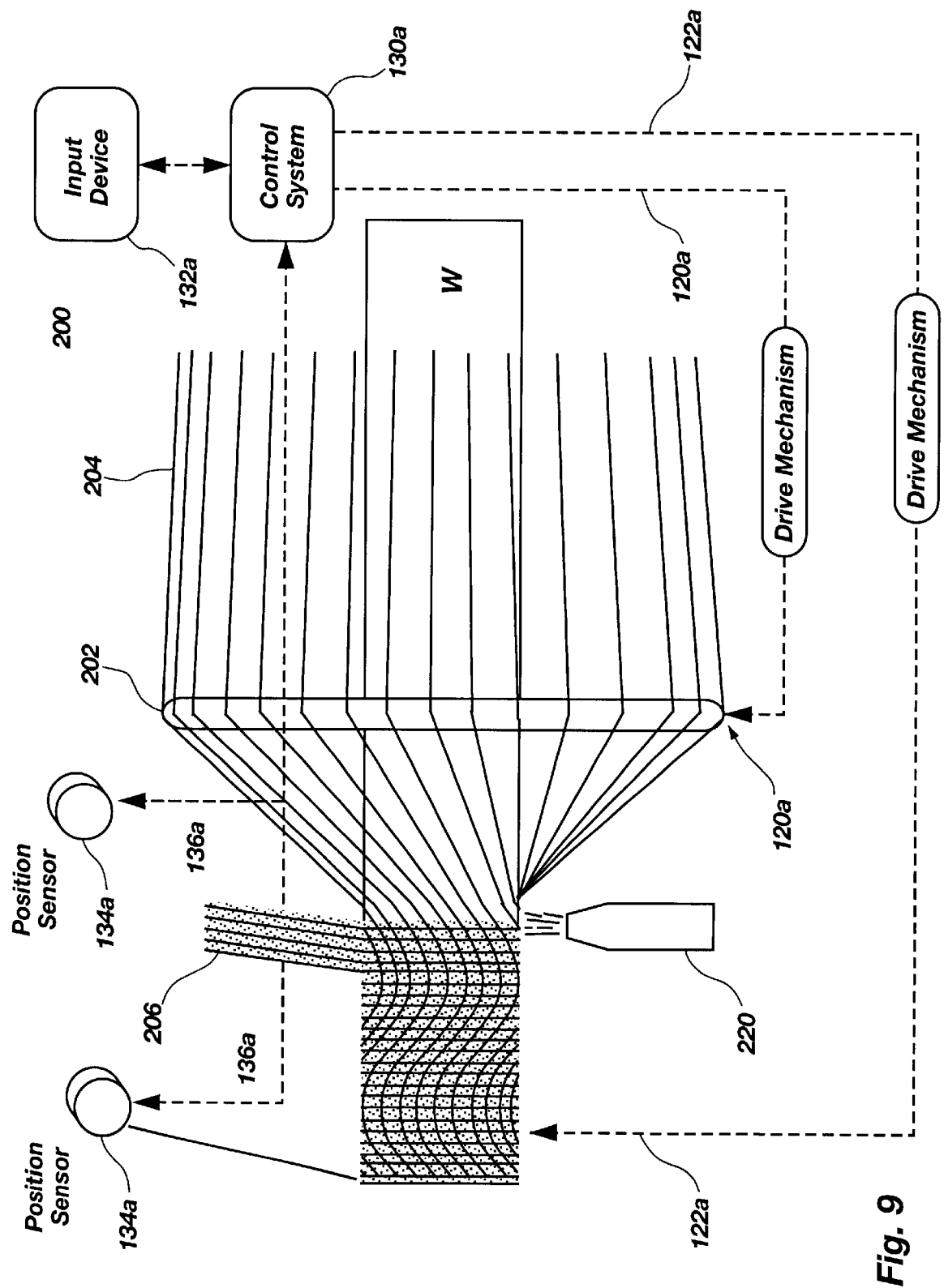
FIG. 9 is a schematic illustration of an alternate apparatus according to the present invention for manufacturing a composite material.
Figure 10:
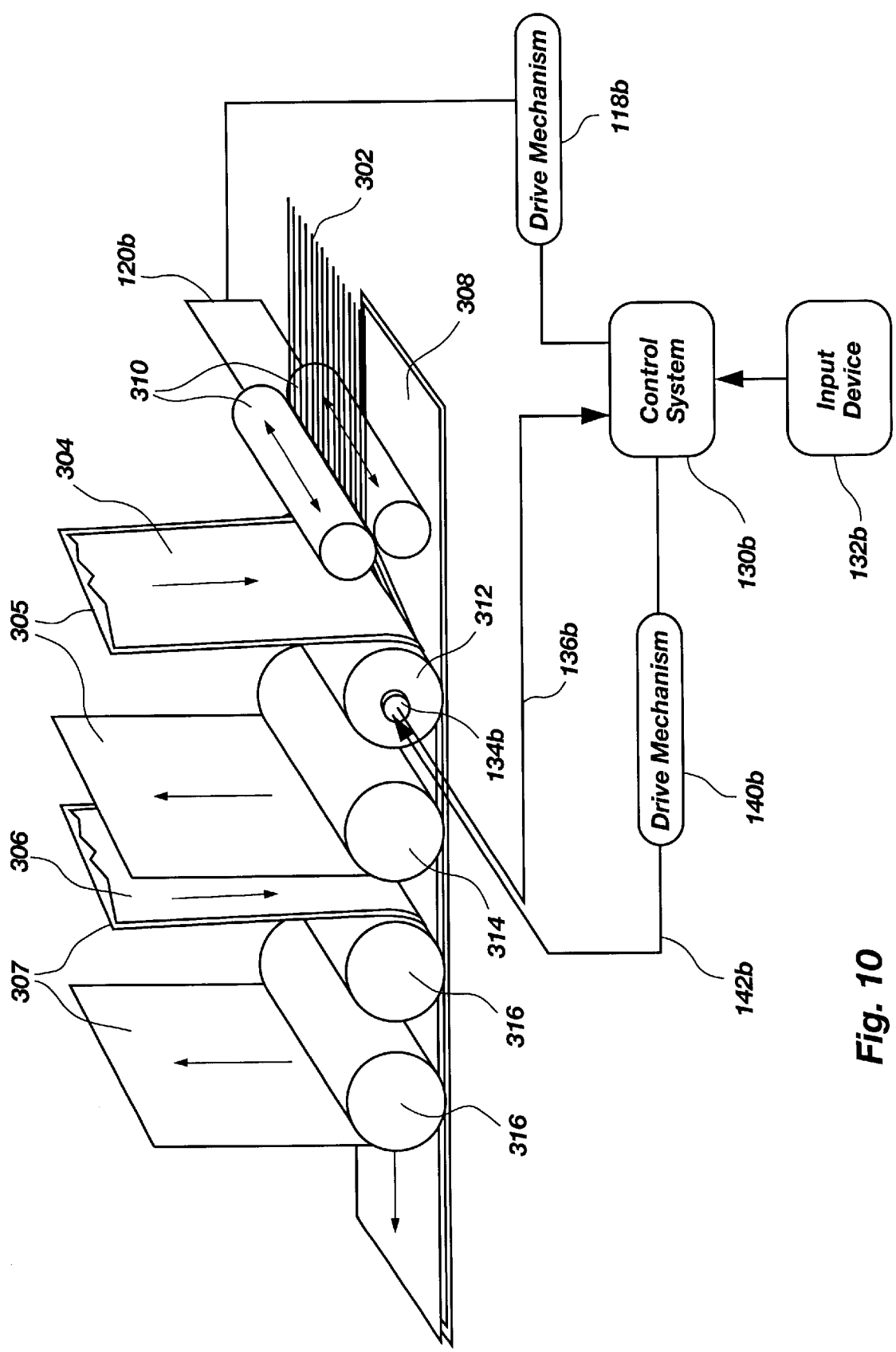
FIG. 10 is a schematic illustration of another alternate apparatus according to the represent invention for manufacturing a composite material.
Figure 11:
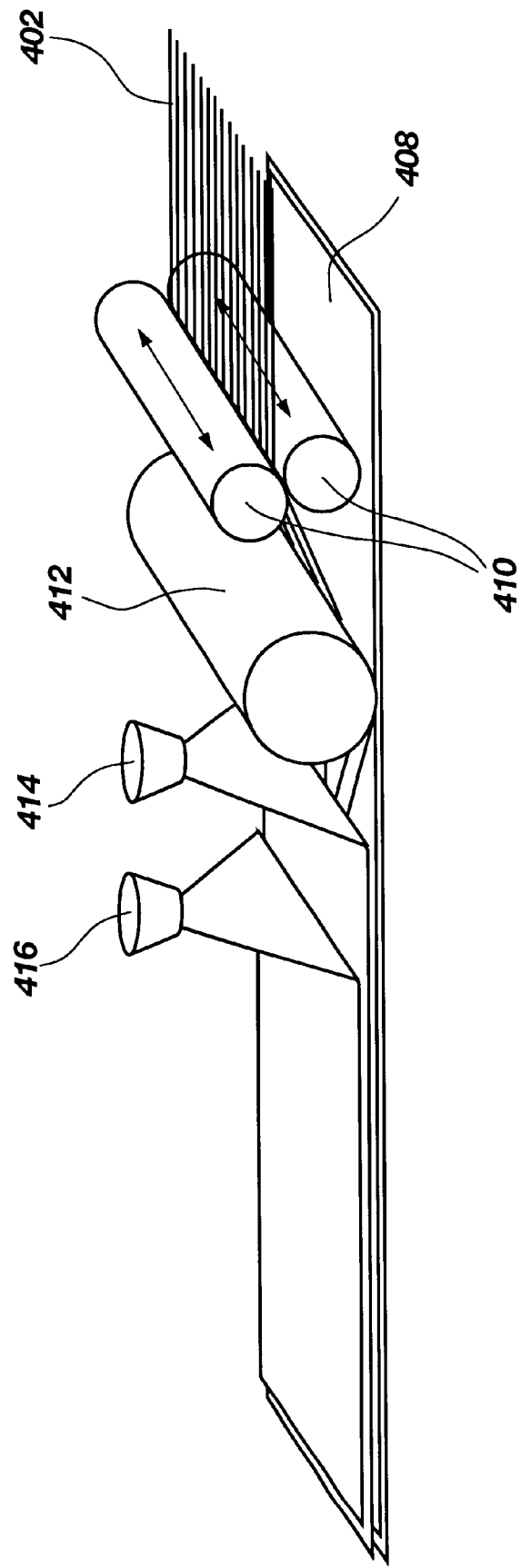
FIG. 11 is a schematic illustration of yet another alternate apparatus according to the present invention for manufacturing a composite material.
Figure 12:
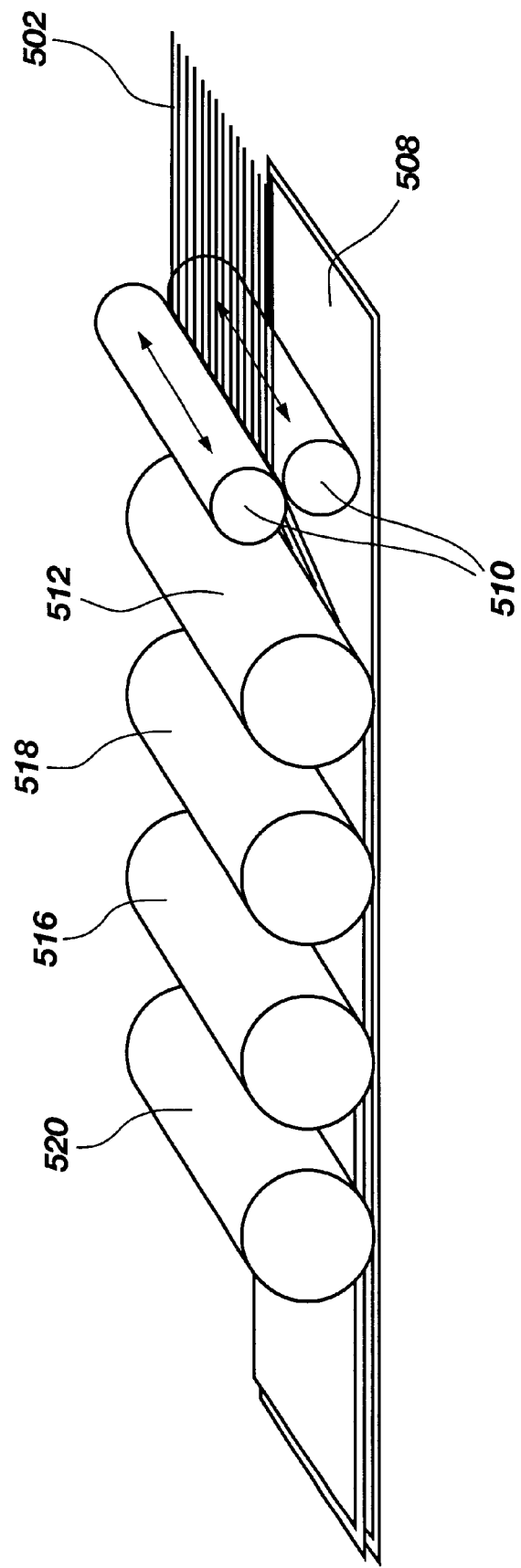
FIG. 12 is a schematic illustration of still another alternate apparatus according to the present invention for manufacturing a composite material.

In FIG. 13a the plate (1) is comprised of two CWC laminates of opposing wave forms (4 & 5) constraining a viscoelastic layer (2). In FIG. 13a-1 two of the laminates shown in FIG. 13a are combined without a viscoelastic layer in between so that the CWC laminates which are bonded together without the benefit of a viscoelastic layer are of a matched waveform (Item 5). The laminate representation is (4)/(2)/(5)/$_2$(2)/(4) where the number in parenthesis represents the material type as discussed above, and the subscript denotes the number of laminates of the indicated type. It has been found that balancing a multi-laminate CWCV plate in this manner gives the most efficient damping and strength performance. Two or more plates as shown in FIG. 13a-1 can be combined to form thicker laminates as shown in FIG. 13a-2 (6).

The CWCV plate shown in FIG. 13a has its primary damping properties along the direction of the fiber pattern. The transverse damping properties are not as pronounced. FIG. 13b is a way of combining two CWCV laminates oriented at different angles with respect to each other and bonded by a viscoelastic layer. This allows the engineer and designer to design structures with efficient damping properties in more than one direction. The example shown in FIG. 13b shows two CWCV plates oriented at 90° with respect to each other. Items 4, 2, and 5 from FIG. 13a are combined with an additional viscoelastic layer (2) and another laminate (4a, 2, 5a) which are oriented in a different direction.

The laminate in FIG. 13b, provides efficient damping in more than one direction but represents an unbalanced ply laminate. The plate shown in FIG. 13c is a way of combining four CWCV plates with the top and bottom plates oriented in the same direction and the intermediate two plates oriented in another direction. Of course it is possible to combine multiple plates as shown in FIGS. 13a, 13a-1 and 13a-2 in various directions to provide efficient damping and strength properties according to the design goals of the engineer.

FIG. 13d shows a CWC laminate (4) combined with viscoelastic materials (2) and conventional materials (7) which can be composed of traditional cross-ply laminates, isotropic materials, plastics, or other materials according to the design criteria of the engineer. In this case the conventional materials are shown constraining a central CWC laminate.

FIG. 13e shows the same basic structure of 13d but instead of a single CWC laminate, the conventional material (7) constrains an opposing CWCV plate (such as shown in FIG. 13a). The designer is not limited to a single CWC laminate or a single CWCV plate but may combine any of the structures shown in 13a, 13a-1, 13a-2, 13b, and 13c to produce a CWCV plate with tailored properties of stiffness and damping in one or multiple directions.

FIGS. 13f and 13g show the same concepts as FIGS. 13d and 13e with one conventional material constraining layer (7) removed. The comments for 13d and 13e apply equally to these figures. It is therefore possible to produce a CWCV plate with tailored properties of stiffness and damping in one or multiple directions.

FIG. 13h shows a single conventional material (7) constrained on two sides by a CWCV plate. As shown in FIG. 13h the constraining CWC laminates (4 or 5) do not have to be opposing waveforms, but may if the designer chooses. FIG. 13i shows the same basic structure as FIG. 13h only with multiple CWCV plates.

In summary, it is possible for the designer to combine multiple layers of CWC laminates, viscoelastic materials, and conventional materials in any number of configurations according to the design criteria of the engineer. The examples of FIG. 13 are for illustrative purposes and other combinations will be obvious to one skilled in the art.

CWCV Stiffener Building Blocks

According to one aspect of the invention, a CWCV plate is bent to form any of the other building blocks all of which are termed "stiffeners". There are four basic shapes of a stiffener building block including the hat-stiffener, the I-beam, the C-channel, and the Z-channel. The terminology "hat-stiffener" will mean any channel shaped stiffener commonly used on lightweight structures. Generally they are "U" shaped in cross section but they can be any cross sectional shape such as semi-circle, "V" shaped, three sided square, etc.

The CWCV hat-stiffener is shown as Item 1 in FIG. 14 and is a basic building block for intermediate structural members and larger structures. For example, it can be used in combination with CWCV or conventional material plates to form a beam (for short widths) or part of a panel (for greater widths). The CWCV plate-hat-stiffener combination is an intermediate structural building block for several other larger structures such as panels, beams, curved surfaces, aerodynamic surfaces, rotor blades, propellers, skis, snow boards, any monocoque structure, and many practical structural members.

As shown in FIG. 14a (perspective view) a generalized hat-stiffened panel would consist of a hat-stiffener (1) shown with a (for example) sinusoidal wave form, (2) a structural laminate or a CWCV laminate (no wave form shown), and (3) a second structural laminate or a CWCV laminate (no wave form shown), or, a special surface treatment or material.

The composition of the hat-stiffener (FIG. 14a, Item 1) could include any one of the CWCV plates shown in FIG. 13. The laminates of FIG. 14a (2) and (3) could consist of one or more of the following: a) one or more opposing CWCV plates (from FIG. 13), and b) a conventional structural material such as an isotropic metal, a conventional composite laminate, or any other suitable structural material.

FIGS. 14b through 14e show end views of only a few of the possible combinations of CWCV hat-stiffeners, conventional materials, CWCV plates, and viscoelastic materials (not shown to scale), and are meant to serve as examples for the structure shown in FIG. 14a.

In FIGS. 14b and 14e the hat-stiffener (1) consists of three laminates and two damping layers (shown shaded). In one embodiment all three laminates would consist of CWC laminates (4) & (5), and would constrain two viscoelastic or anisotropic viscoelastic damping layers (6). Two of the CWC laminates would be of one pattern (4) on the inner and outer surfaces of the hat-stiffener, with an opposing CWC laminate (5) (a laminate having the same basic pattern of (4) but with a 180° phase shift), in the middle. (Figures are not drawn to scale.) An alternative embodiment would have the three laminates consist of one each of a CWC laminate, an opposing CWC laminate, and a conventional laminate or other material, constraining two viscoelastic or anisotropic viscoelastic damping layers (6). The three structural laminates are joined together at the "feet" for good bonding and structural purposes, the damping material being omitted in the region of the feet for this purpose. It is not necessary to configure the damping layers as shown (e.g. in an inverted "U" shape, on top and sides) but the damping layer may be on the top only, on the side only, or eliminated altogether, depending on the requirements of the designer. These examples were given using more than one viscoelastic layer and CWC laminate; of course it is possible to use any number of CWC laminates, viscoelastic layers, or conventional material layers, in any combination, to accomplish the design goals.

The laminate (2) of FIG. 14a is shown as item (7) in FIG. 14b, could be composed of a conventional composite or other structural material, and would thus represent the main load bearing member in the plate. As shown, the feet of the hat-stiffener are joined directly to the load bearing member (7) promoting strength and good bonding. The laminate (3) of FIG. 14a is shown as Items (4), (5), & (6) in FIG. 14b, and consists of two laminates and two damping layers (shown shaded). In one embodiment both laminates would consist of wavy pattern CWC laminates (4) & (5), and would constrain two viscoelastic or anisotropic viscoelastic damping layers (6). One of the CWC laminates would be of one pattern (4), with an opposing CWC laminate (5). An alternative embodiment would have the two laminates consist of a CWC laminate, and a conventional laminate or other material, constraining two viscoelastic or anisotropic viscoelastic damping layers (6). Only two laminates are shown in FIG. 14b but it is possible to have any number of alternating layers of opposing CWC laminates, viscoelastic or anisotropic viscoelastic damping layers, and conventional composites, according to the design criteria of the engineer.

The laminate (2) & (3) of FIG. 14a is shown as items (4), (5), & (6) in FIGS. 14c and 14d consists of multiple laminates and damping layers (shown shaded). In one embodiment the laminates would consist of multiple wavy pattern CWC laminates (4) & (5), and would constrain multiple viscoelastic or anisotropic viscoelastic damping layers (6). Some of the CWC laminates would be of one pattern (4), with opposing CWC laminates (5). An alternative embodiment would have some of the laminates consist of CWC laminates, with some of conventional laminate or other material, constraining the viscoelastic or anisotropic viscoelastic damping layers (6). It has been determined that the structure of FIG. 14c provides the most efficient and lightweight balanced hat-stiffened panel since it relies on the balanced laminate of FIG. 13b. Instead of a flexible plate as shown in FIG. 13b , the two CWCV plates are split, one becoming a hat-stiffener. It is possible to add an additional plate where the two plates split to form the hatstiffener, so that the final cross section retains a uniform thickness and laminate structure. The designer is not limited to the use of only two plates. The "plate" makeup may include any of the possible combinations discussed for FIG. 13, according to the design criteria of the engineer. Other combinations will be obvious to one skilled in the art.

The laminate (2) of FIG. 14a is shown as items (4), (5), & (6) in FIG. 14d, and consists of multiple laminates and damping layers (shown shaded). In one embodiment the laminates would consist of opposing wavy pattern CWC laminates (4) & (5), and would constrain viscoelastic or anisotropic viscoelastic damping layers (6). An alternative embodiment would have the some of the laminates consist of opposing CWC laminates, some conventional laminates or other materials, all constraining the one or more viscoelastic or anisotropic viscoelastic damping layers (6). It is possible to have any number of alternating layers of opposing CWC laminates, viscoelastic or anisotropic viscoelastic damping layers, and conventional composites, according to the design criteria of the engineer. The laminate (3) of FIG. 14a is shown as item (7) in FIG. 14d, could be composed of a conventional composite or other structural material, and would thus represent the main load bearing member in the plate.

FIG. 14 shows only a few of the design possibilities of the use of CWCV hat-stiffeners, CWCV plates, viscoelastic damping materials, mixed (if desired) with conventional composite or other materials. Other configurations will be obvious to one skilled in the art.

I-beam, C-channel, Z-channel Building Blocks

The CWCV I-beam stiffener is shown as Item 1 in FIG. 15 and is a basic building block for intermediate structural members and larger structures. For example, it can be used in combination with CWCV or conventional material plates to form a beam (for short widths) or part of a panel (for greater widths). The CWCV plate-I-beam stiffener combination is an intermediate structural building block for several other larger structures.

As shown in FIG. 15a (perspective view) a CWCV I-beam stiffener (1) would be combined with a structural laminate or a CWCV plate (3) shown with a (for example) sinusoidal wave form, and a second structural laminate or a CWCV plate (2) (no wave form shown), or, a special surface treatment or material.

The I-beam stiffener (1) could consist of one or more of the following: a) a conventional composite laminate, conventional structural material such as an isotropic metal, or any other suitable material, and/or b) one or more opposing CWC laminates with one or more constrained damping layers of viscoelastic material.

The flanges (2 & 3) could consist of one or more of the following: a) one or more opposing CWC laminates constraining one or more damping layers of viscoelastic material, and/or b) a combination of CWC laminates, viscoelastic or anisotropic viscoelastic damping layers, and conventional composites or other suitable structural material.

FIGS. 15b through 15f show end views of only a few of the possible combinations of CWCV stiffeners, conventional materials, and CWCV.

FIG. 15b shows one example of a CWCV I-beam stiffener combined with two CWCV plates (flanges). Any of the CWCV plates shown in FIG. 13 could be combined to form the basic I-beam shown in FIG. 15b.

FIG. 15c shows one example of a CWCV C-channel stiffener combined with two CWCV plates (flanges). Any of the CWCV plates shown in FIG. 13 could be combined to form the intermediate structure shown in FIG. 15c.

FIG. 15d shows one example of a CWCV Z-channel stiffener combined with two CWCV plates (flanges). Any of the CWCV plates shown in FIG. 13 could be combined to form the basic intermediate structure shown in FIG. 15d.

FIGS. 15e and 15f amplify FIGS. 15c and 15d respectively to show that the CWCV stiffeners may be formed without viscoelastic materials in the "feet" to promote good bonding and strength.

As stated above, the examples of FIG. 15 are basic building blocks for damped panels, beams, surfaces, and structural members. FIG. 15 shows only a few of the design combinations in the use of CWC laminates, CWCV plates, viscoelastic damping materials, mixed (if desired) with conventional composite or other materials. Any of the CWCV plates and/or combinations of materials shown in FIG. 13 could be used to make the four basic stiffener building blocks, and any of the exampled intermediate CWCV structures.

CWCV Plate Sandwiched Core Intermediate Structural Member

As shown in FIG. 16a (perspective view) a CWCV plate sandwiched core intermediate structural member would consist of a core (3), a structural laminate or a CWCV plate (1) shown with a (for example) sinusoidal wave form, and a second structural laminate or a CWCV plate (2) (no wave form shown), or, a special surface treatment or material.

The sandwiched core (3) could consist of one or more of the following: a) a honeycombed material (3a) b) and/or (3b) a structural foam, special core material for sound proofing, wood, or any other suitable core material(s) and combinations commonly used to provide form to the structure.

The plate (1 & 2) could consist of one or more of the following: a) one or more opposing CWC laminates constraining one or more damping layers of viscoelastic or anisotropic viscoelastic material, and/or b) a combination of CWC laminates, viscoelastic or anisotropic viscoelastic damping layers, and conventional composites or other suitable structural material, or any of the CWCV plates represented in FIG. 13.

FIGS. 16b & 16c show cutaway end views of only a few of the possible combinations of conventional, CWC laminates, and viscoelastic materials (not shown to scale), and are meant to elaborate on the structure shown in FIG. 16a.

The plate (2) of FIG. 16a is shown as item (7) in FIG. 16b, could be composed of a conventional composite or other structural material, and would thus represent the main load bearing member in the laminate.

The plate (1) of FIG. 16a is shown as items (4), (5), & (6) in FIG. 16b, and consists of one or more laminates and damping layers (shown shaded). In one embodiment the laminates would consist of opposing wavy patterned CWC laminates (5) & (6), constraining viscoelastic or anisotropic viscoelastic damping layers (4). An alternative embodiment would have some of the laminates consist of CWC laminates, some would consist of conventional laminates or other suitable materials, all having the purpose of constraining one or more viscoelastic or anisotropic viscoelastic damping layers (4). Two CWC laminates are shown in FIG. 16b but it is possible to have any number of alternating layers of opposing CWC laminates, viscoelastic damping layers, conventional composites, anisotropic viscoelastic, or other materials, according to the design criteria of the engineer. As shown, the sandwiched core is joined directly to the load bearing member (7) promoting strength and good bonding. Of course the order of items 4–7 could be reversed where the load bearing laminate (7) was located on the outside of the core surface.

The laminates (1 & 2) of FIG. 16a are shown as items (4–8) in FIG. 16c, and consists of multiple CWC laminates and damping layers (shown shaded). In one embodiment the laminates would consist of multiple wavy pattern CWC laminates (5) & (6), and would constrain multiple viscoelastic or anisotropic viscoelastic damping layers (4). Some of the CWC laminates would be of one pattern (5), with opposing CWC laminates (6). An alternative embodiment would have some of the laminates consist of CWC laminates, with some of conventional laminate or other material, constraining the viscoelastic or anisotropic viscoelastic damping layers (4). The plate sandwiched core could include conventional composites or other materials (Items 7 & 8) to provide additional strength. It is also possible to eliminate laminate (7) on the surface of the sandwiched core in FIG. 16c which would bond the viscoelastic material (4) directly to the sandwiched core.

As stated above, the examples of FIG. 16 are basic building blocks for damped plates, panels beams, surfaces, and structural members. FIG. 16 shows only a few of the design combinations in the use of CWCV plates laminated to various core materials.

CWCV Stiffeners and Sandwiched Core Structures

FIG. 17 shows one of the many possible uses and combinations of CWCV building blocks (plates and stiffeners) and sandwiched core CWCV structures as discussed for FIGS. 13–16 above, in the design of aerodynamic structures (1 & 2). FIGS. 17a and 17c show two such possibilities using a typical airfoil (1 & 2) as an example. In FIG. 17a multiple CWCV hat-stiffeners (FIG. 14) are combined with one or more CWCV plates (FIG. 13) and joined together to form the airfoil (1). In FIG. 17c two CWCV plates (FIG. 13) are applied to a sandwiched core (FIG. 16) to form the airfoil (2) and are reinforced by two C-channel CWCV stiffeners (or conventional stiffeners).

FIG. 17b shows a blown up view of a portion of the hat-stiffened CWCV airfoil of FIG. 17a. FIG. 17b makes use of a CWCV hat-stiffened intermediate structural member illustrated in FIG. 14b. Hollow spaces (10) in the airfoil (1) could be left open for the passage of heated or cooling air, fuel, fluids, or coolant, or could be filled with sound deadening materials, structural foams or other materials depending on the requirements of the design. The above discussion illustrates one example of the use of CWCV basic building block concepts of FIGS. 13–16 used in aerodynamic structures; others will be obvious to one skilled in the art. Such CWCV aerodynamic structures could be used in wings, control surfaces, propeller blades, turbine blades, rotor blades, fan blades, and any other aerodynamic structure where damping, strength, and stiffness are important.

FIG. 17d shows a blown up view of a portion of the CWCV sandwiched core and C-channel stiffened airfoil of FIGS. 17c. FIG. 17d makes use of both the C-channel stiffener building block illustrated in FIG. 15c and the sandwiched core of FIG. 16b. Hollow spaces (10) in the airfoil (2) could be left open for the passage of heated or cooling air, fuel, fluids, or coolant, or could be filled in with sound deadening materials, structural foams or other materials depending on the requirements of the design. Such CWCV aerodynamic structures could be used in wings, control surfaces, propeller blades, turbine blades, rotor blades, fan blades, and any other aerodynamic structure where damping, strength, and stiffness are important.

As previously discussed, the basic building blocks shown in FIGS. 13 through 16 (and discussed above) can be used in any number of combinations to provide unique damping, strength, stiffness, and acoustic properties. Only two possible designs have been shown; others will be obvious to a person skilled in the art that such combinations would be possible and desirable in certain design situations. Thus it is not necessary to limit the designer to only one family of the many designs shown in FIGS. 13 through 16. For example, using high temperature matrix and damping materials in a fan blade (as shown in FIGS. 17a & 4c) would allow the use of CWCV materials in the construction of damped compressor and turbine fans. Cooling air would be passed through the airfoil spaces (48) as is done for conventional metallic fan blades and would control the temperature of the materials. Thus any of the basic designs of FIGS. 13 through 16 could be used in any combination to attain a desired structural characteristic.

CWCV Stiffeners, Plates, and Sandwiched Cores Used in Panels, Floors. Beams & Other Structures.

The use of highly damped materials is beneficial in the building of virtually every structure. In civil structures the use of the CWCV building blocks of FIGS. 13–16 can provide both structural and damping performance not previously attainable. The same can be said for aerospace, automotive, and other structures where damping and structural dynamics are important.

FIG. 18 shows a few of the many possible uses and combinations of CWCV hat-iffeners, I-beam stiffeners, and in the construction of larger panels, floors, beams, and structural members. FIGS. 18a through 18e show several such possibilities. There are many ways of making panels or floors from the various CWCV building blocks (e.g. CWCV plates and stiffeners). FIG. 18a shows a typical aircraft floor composed of CWCV I-beams from FIG. 15a coupled to a conventional floor plate or a CWCV plate from FIG. 13. FIG. 18b adds an additional conventional or CWCV plate for added stiffness. FIG. 18c makes use of CWCV plates from FIG. 13 and various combinations of CWCV hat-stiffeners from FIG. 14. Any combination of the CWCV plates (FIG. 13) or stiffener building blocks (FIGS. 14–16) can be used to construct these highly damped panels. The examples in FIG. 18 are shown with a flat shape, but these same combinations can be formed in any number of geometric shapes.

There are many more possible combinations of CWCV laminates, stiffeners, core materials, etc. that will be obvious to one skilled in the art.

CWCV Building Blocks Used in Skis and Other Sports Equipment.

Skis, snowboards, waterskis and other sports equipment can benefit from the addition of structural materials with inherent damping as represented by the use of CWCV building blocks. For example, downhill racers rely on the dynamics of their skis ability to provide solid contact with the ground and maintain control. Skis that chatter are a hazard. Skis with inherent structural damping are therefore of great value to the sport.

FIG. 19 shows an example of one of the many possible uses of CWCV structures in the design of skis, snowboards, etc.

As shown in FIG. 19a (perspective view) a CWCV enhanced ski would consist of a CWCV covered core (1 & 4) shown with a (for example) sinusoidal wave form. The core (4) could consist of any of the materials discussed in FIG. 16 above such as honeycomb, foam, wood, etc. The core is strengthened by the addition of a CWCV plate (1) which can consist of any of the examples discussed in FIG. 13, and strengthened by the addition of any of the basic CWCV stiffeners or other intermediate structures as discussed in FIGS. 14–16. Metallic (or other suitable material) edges (2) would be bonded to the CWCV wrapped core (1 & 4). Typically a special plastic or other material is bonded to the bottom of the ski (3) to provide protection to the ski and to give the ski special surface properties for better performance. Likewise a protective coating is applied to the top and sides of the ski (5) to provide protection to the core structure.

FIGS. 19b through 19d show cutaway end views of examples of the use of CWCV plates and other materials in the design and construction of a ski. In general, the combinations of conventional and CWCV plates (FIG. 13), shown in FIGS. 19b–19d mirror the possible combinations discussed in conjunction with FIG. 13. The various combinations of CWC laminates (7 & 8) combined with viscoelastic material (6), conventional laminates or isotropic materials (9) and special protective surface materials (3) can be arrayed as shown depending upon the dynamic properties desired.

Two specific examples of skis that have been built using CWCV plates and conventional materials are shown in FIGS. 20 and 21. The ski discussed in FIG. 19 is shown in FIG. 20 assembled (FIG. 20a) and in exploded view in FIG. 20b. In FIG. 20 conventional laminates "packs" (6) were replaced by combinations of unidirectional carbon composite (7) viscoelastic layers (8) and opposing CWC laminates (9 & 10). Torsional rigidity was provided by the ±45° bi-directional composite cloth. The combination is laminated on to the core (4) and enveloped by protective coatings (3 & 5) and cured in the standard manner.

An alternative embodiment of the ski shown in FIG. 20 is represented in FIG. 21 shown assembled (FIG. 21a) and in exploded view in FIG. 21b. As shown in FIG. 21 the basic structure discussed for FIG. 20 applies in this figure as well, except that the alternating layers of viscoelastic (8) and CWC laminates (9 & 10) are wrapped around the bi-directional clothcovered core (4). The scaling shown in FIGS. 19–21 are exemplary of a few of the many assembly methods available to the designer. By varying the amounts of conventional composites (7 & 11) and CWCV plates (8–10) it is possible to "tune" the dynamics of the ski.

There are many other combinations of viscoelastic or anisotropic viscoelastic materials, and conventional composites, special coatings, or other materials which can be used to design and build the ski, and will be obvious to one skilled in the art.

For example, in the case of the water ski, it may be desirable to eliminate the metallic edges (2) and the special covering for the bottom (3) or the top & sides (5). In this case, the CWC laminates on the surface would provide the aesthetic covering as well as the damping and structural properties of the ski.

The example CWCV ski structures discussed above could be used for snow skis, snow boards, surf boards, slalom skis, beams, boards, and many sports equipment or structural components where damping, strenCth, and stiffness are important.

CWCV Tubes.

A CWCV tube can be made from the basic CWCV plate building block discussed in FIG. 13. Although the basic structure shown in FIG. 22e was contemplated by Dolgin, the use of stepped CWCV plates as shown in FIGS. 22f and 22g was not. Neither was the use of the non-sinusoidal wave forms of FIGS. 1–5. The use of the conepts in FIGS. 1–5 and 13 in the design and the manufacture of tubular structures can provide damping and reinforcement to diverse structural components such as concrete pillars, pilings, beams, and foam or other cored structures. For example, the use of CWC bi-directional cloth where the fill fibers are straight and the wavy fibers are oriented as in FIG. 22a will provide containment, damping, and structural reinforcement for a concrete beam or colmn. The use of CWCV structural reinforcement and dampings will provide additional safety margin, survivability, and increased service life to a concrete structure. It is well-known that the use of composite materials as a surface treatment for standard concrete structures is highly desirable and becoming more common. None of the current methods, however, add inherent damping to the structure.

The CWCV tubes shown in FIGS. 22b through 22g can be used in the manufacture and improved dynamics of sports equipment as diverse as golf club shafts, arrow shafts, tennis rackets and similar devices, baseball bats and similar devices, poles, shafts (such as helicopter and automotive drive shafts), antennae components, bicycle components and frames and fishing rods.

The tubular examples of FIG. 22 are shown with a round cross section but any cross section can be used including elliptical, square, rectangular, polygonal, aerodynamic, or even a special irregular shape or combination of shapes designed to optimize structural parameters. The tubular examples of FIG. 22 are also shown of constant and uniform cross section throughout the length of the tube. Of course it is possible to taper the tube, bend the tube in any reasonable shape, or even create an irregular taper and shape along its length depending on the application. It is a common practice to construct a tube on a straight mandrel (for example) remove it prior to curing, place it in a curved mold, and form curved tubes of constant or variable cross section and shape. Such a process would be used in the manufacture of a CWCV damped tennis racket (for example). Of course any of the material combinations discussed in conjunction with FIGS. 1–5, 13–16, could be used in the manufacture of a CWCV tube.

What is claimed is:

1. An intermediate structural member, which comprises:
    a first plate, which comprises
        at least one continuous wave composite layer; and
        a layer of viscoelastic material adjacent to said continuous wave composite layer;
    a second plate; and
    a sandwiched core located between said first plate and said second plate.

2. The intermediate structural member as recited in claim 1, wherein:
    said second plate comprises
        at least one continuous wave composite layer; and
        a layer of viscoelastic material adjacent to said continuous wave composite layer.

3. The intermediate structural member as recited in claim 1, wherein:
    said second plate comprises any conventional composite.

4. The intermediate structural member as recited in claim 1, wherein:
    said second plate comprises any traditional structural material.

5. A planar continuous wave composite viscoelastic building block, which comprises:
    at least one continuous wave composite layer; and
    layer of viscoelastic material adjacent to said continuous wave composite layer,
        said continuous wave composite viscoelastic building block has been bent so as to comprise:
            a first planar segment;
            a second planar segment attached to said first planar segment and angled with respect to said first planar segment so that the smallest angle formed by said first planar segment and said second planar segment is more than ninety degrees but less than one hundred eighty degrees;
            a third planar segment attached to said second planar segment and angled so that said third planar segment is substantially parallel to said first planar segment;
            a fourth planar segment attached to said third planar segment and angled so that said fourth planar segment is substantially symmetrical to said second planar segment; and
            a fifth planar segment attached to said fourth planar segment and angled so that said fifth planar segment is substantially parallel to said first planar segment.

6. A planar continuous wave composite viscoelastic building block, which comprises:
    at least one continuous wave composite layer; and
    a layer of viscoelastic material adjacent to said continuous wave composite layer, wherein:
        said continuous wave composite viscoelastic building block has been bent so as to comprise:
            a first planar segment;
            a second planar segment attached to said first planar segment and angled to form a substantially right angle with respect to said first planar segment; and
            a third planar segment attached to said second planar segment and angled to form a substantial right angle with respect to said second planar segment so that, as viewed from either end, said continuous wave composite viscoelastic building block is shaped in the form of a block letter "C."

7. A planar continuous wave composite viscoelastic building block, which comprises:
    at least one continuous wave composite layer; and
    a layer of viscoelastic material adjacent to said continuous wave composite layer, wherein:
        said continuous wave composite viscoelastic building block has been bent so as to comprise:
            a first planar segment;
            a second planar segment attached to said first planar segment and angled to form a substantially right angle with respect to said first planar segment; and
            a third planar segment attached to said second planar segment and angled to form a substantially right angle with respect to said second planar segment so that, as viewed from either end, said continuous wave composite viscoelastic building block is shaped in the form of a block letter "Z" where the middle segment of the "Z" is vertical.

8. A continuous wave composite viscoelastic building block, which comprises:
    a first composite viscoelastic plate;
    a planar member attached to said first composite viscoelastic plate and angled to form a substantially right angle with respect to said viscoelastic plate; and
    a second continuous wave composite viscoelastic plate attached to said planar member so that, as viewed from either end, said continuous wave composite viscoclastic building block is shaped in the form of a block letter "I".

* * * * *